US012668262B2

(12) United States Patent
Moriya et al.

(10) Patent No.: US 12,668,262 B2
(45) Date of Patent: Jun. 30, 2026

(54) POINT MANAGEMENT SYSTEM FOR VEHICLE AS CONTACT POINT

(71) Applicant: DENSO CORPORATION, Kariya-city (JP)

(72) Inventors: Shota Moriya, Kariya-city (JP); Yoshiyuki Tsuda, Kariya-city (JP); Sayaka Oka, Kariya-city (JP); Makiko Sugiura, Kariya-city (JP); Marie Nagahama, Kariya-city (JP); Riho Watanabe, Kariya-city (JP); Yasue Yonezu, Kariya-city (JP); Yayoi Hamamoto, Kariya-city (JP); Yoshifumi Ito, Kariya-city (JP); Daichi Yagi, Kariya-city (JP); Kanako Kanazawa, Kariya-city (JP); Yusuke Kawazuta, Kariya-city (JP); Shota Ibara, Kariya-city (JP); Takeru Imai, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 38 days.

(21) Appl. No.: 18/649,261

(22) Filed: Apr. 29, 2024

(65) Prior Publication Data

US 2024/0278800 A1 Aug. 22, 2024

Related U.S. Application Data

(63) Continuation of application No. PCT/JP2022/038581, filed on Oct. 17, 2022.

(30) Foreign Application Priority Data

Nov. 1, 2021 (JP) ................................. 2021-178810
Aug. 31, 2022 (JP) ................................. 2022-138008

(51) Int. Cl.
*B60W 50/14* (2020.01)

(52) U.S. Cl.
CPC ......... *B60W 50/14* (2013.01); *B60W 2540/10* (2013.01)

(58) Field of Classification Search
CPC ... B60W 50/14; B60W 2540/10; G01C 21/36; G06Q 50/10
(Continued)

(56) References Cited

U.S. PATENT DOCUMENTS

2010/0185359 A1* 7/2010 Tauchi .................... G07C 5/085
                                                                     701/31.4
2017/0311863 A1 11/2017 Matsunaga
2020/0184500 A1* 6/2020 Yuyama ................ B60W 40/09

FOREIGN PATENT DOCUMENTS

JP          2002083371 A      3/2002
JP          2010039639 A      2/2010
(Continued)

*Primary Examiner* — Omar Casillashernandez
(74) *Attorney, Agent, or Firm* — Harness, Dickey & Pierce, PLC

(57) ABSTRACT

A point management system using a vehicle as a contact point includes: an evaluation device that evaluates a specific activity of an user of the vehicle based on vehicle information according to a travel state of the vehicle or activity information recorded in a smart device of the user; a point giving device that gives the point to the user according to an evaluation by the evaluation device; and a propose device that proposes, to the user, an activity for which the point is given. The specific activity includes at least one of three categories of an eco-driving activity, a health care activity, and a social contribution activity.

26 Claims, 12 Drawing Sheets

(58) Field of Classification Search
USPC ......................................................... 340/438
See application file for complete search history.

(56) References Cited

FOREIGN PATENT DOCUMENTS

| | | | |
|---|---|---|---|
| JP | 2010149679 | A | 7/2010 |
| JP | 2010250363 | A | 11/2010 |
| JP | 2010261398 | A | 11/2010 |
| JP | 2013103666 | * | 5/2013 |
| JP | 2013103666 | A | 5/2013 |
| JP | 2013122685 | * | 6/2013 |
| JP | 2013122685 | A | 6/2013 |
| JP | 2013195252 | A | 9/2013 |
| JP | 6467965 | B2 | 2/2019 |
| JP | 202095403 | A | 6/2020 |
| JP | 2020198036 | * | 12/2020 |
| JP | 2020198036 | A | 12/2020 |
| JP | 2021033864 | A | 3/2021 |

* cited by examiner

POINT MANAGEMENT SYSTEM FOR VEHICLE AS CONTACT POINT

CROSS REFERENCE TO RELATED APPLICATION

The present application is a continuation application of International Patent Application No. PCT/JP2022/038581 filed on Oct. 17, 2022, which designated the U.S. and claims the benefit of priority from Japanese Patent Applications No. 2021-178810 filed on Nov. 1, 2021, and No. 2022-138008 filed on Aug. 31, 2022. The entire disclosures of all of the above applications are incorporated herein by reference.

TECHNICAL FIELD

The present disclosure relates to a point management system for a vehicle as a contact point, which gives a point according to an activity when an user performs a specific activity using a vehicle as a contact point.

BACKGROUND

For example, as awareness of environmental issues has increased in recent years, it is considered that a system in a vehicle such as an automotive vehicle encourages a driver to execute ecological driving and safe driving, and gives an eco-driving point in response to executing the eco-driving by the driver (for example, according to a conceivable technique). In this system, the driver can receive benefits such as a discount on the lease price according to the point when the driver returns the point acquired by the driver, so that the system provides the motivation to execute the eco-driving by the driver.

SUMMARY

According to an example, a point management system using a vehicle as a contact point may include: an evaluation device that evaluates a specific activity of an user of the vehicle based on vehicle information according to a travel state of the vehicle or activity information recorded in a smart device of the user; a point giving device that gives the point to the user according to an evaluation by the evaluation device; and a propose device that proposes, to the user, an activity for which the point is given. The specific activity includes at least one of three categories of an eco-driving activity, a health care activity, and a social contribution activity.

BRIEF DESCRIPTION OF THE DRAWINGS

The above and other features and advantages of the present disclosure will become more apparent from the following detailed description made with reference to the accompanying drawings. The drawings are as follows.

DETAILED DESCRIPTION

Figure 1:
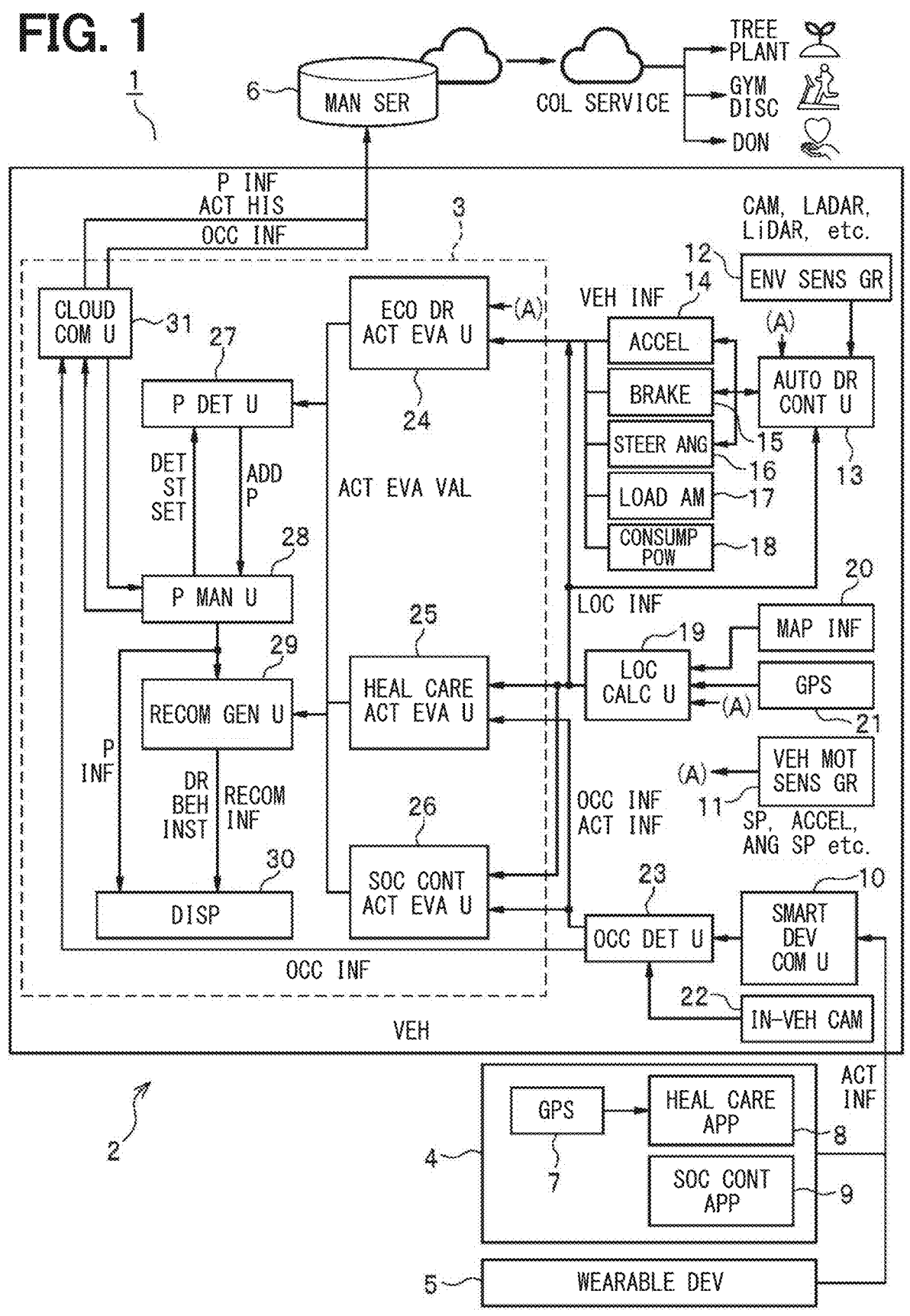
FIG. 1 is a block diagram showing a schematic overall configuration of a point management system according to a first embodiment.

In the conceivable point giving system described above, the point is returned to an user within a limited range, such as the service for the company's leased vehicle, and the system does not provide widespread motivation for encouraging the eco-friendly action (i.e., eco-friendly activity) to all of users of the vehicle. Particularly in recent years, social initiatives such as SDGs (Sustainable Development Goals), for example, for enhancing awareness of lifestyles in harmony with nature to people, have become internationally important.

Therefore, the present embodiments provide a point management system for a vehicle as a contact point to effectively enhance awareness of eco-driving, healthcare activities, social contribution activities, and the like to an user of the vehicle.

In a first aspect of the present embodiments, a point management system is configured to give a point according to an activity when an user of a vehicle performs a specific activity using the vehicle as a contact point.

The point management system includes: an in-vehicle device mounted in a vehicle; a smart device carried by the user of the vehicle and connectable to the in-vehicle device; a management server that communicates with the in-vehicle device;

an evaluation device that evaluates the specific activity of the user based on vehicle information according to a travel state of the vehicle or activity information recorded in the smart device; a point giving device that gives the point according to an evaluation by the evaluation device; and a propose device that proposes, to the user, an activity for which the point is given. The specific activity includes at least one of three categories of an eco-driving activity, a health care activity, and a social contribution activity.

According to this feature, the propose device proposes the activity, to the user, for which the point is given. Then, when the user performs the specific activity using the vehicle as a contact point, the evaluation device evaluates the specific activity of the user based on the vehicle information according to the travel state of the vehicle or the activity information recorded in the smart device. The point corresponding to the evaluation is given by the point giving device. At this time, the specific activity includes at least one of three categories of the eco-driving activity, the health care activity, and the social contribution activity.

Therefore, since the point is given and accumulated by performing the specific activity proposed to the user, the point management system provides sufficient motivation for the user to encourage the eco-driving activity, the health care activity, and the social contribution activity. In this case, for example, it is possible to recommend a social activity in a wide range that affects a lifestyle of the user, rather than a limited range of services provided by one company. As a result, it is possible to obtain an excellent effect that the point management system can effectively enhance awareness of the eco-driving activity, the healthcare activity, the social contribution activity, and the like to the user of the vehicle.

First Embodiment

A first embodiment of a point management system using a vehicle as a contact point will be described below with reference to FIGS. 1 to 7. The point management system using the vehicle as the contact point is a system which gives a point according to an activity when a user, i.e., a driver or a fellow passenger, performs a specific activity using a vehicle as a contact point. In this embodiment, points are given as an example for activities in three categories: eco-driving, healthcare activities, and social contribution activities. In the following description, these activities may be referred to as an activity.

FIG. 1 schematically shows the overall configuration of a point management system 1 according to the present embodiment. This point management system 1 includes an in-vehicle device 3 mounted on a vehicle 2 such as an automotive vehicle, smart devices 4 and 5 carried by a user of the vehicle 2, and a management server 6 that communicates with the in-vehicle device 3. In this embodiment, the smart devices carried by the user include a smartphone 4 having a well-known configuration and a wearable device 5, such as a wristwatch, worn by the user.

The smartphone 4 includes a location detection unit 7 using GPS, and is also equipped with a healthcare application 8 and a social contribution application 9. The health care application 8 records that the user has performed the health care activity, and the social contribution application 9 authenticates and records that the user has performed the social contribution activity. The wearable device 5 is also equipped with a similar application and has a recording function when the user performs the health care activity or the social contribution activity. The smartphone 4 and the wearable device 5 can be connected to the smart device communication unit 10 of the vehicle 2 by short-range wireless communication such as Bluetooth (registered trademark).

The management server 6 is configured as a cloud management server that provides cloud services via a network such as the Internet, for example. As described later, the management server 6 is configured to record and manage a point, such as addition of the point and return of the point after addition for each user, based on data of user information and point information transmitted from the in-vehicle device 3. In this case, the cloud service of the management server 6 returns the point, for example, via another cloud service with which the cloud service collaborates. Specifically, it is possible to plant trees, to discount a fee of a gym, and to donate to a support NGO using the point.

In the vehicle 2, various in-vehicle devices and computers that control them are connected via an in-vehicle network, and collect necessary information, and transmit vehicle information, location information, occupant information, and activity information to an in-vehicle device 3, which will be described later. That is, as the in-vehicle device, the vehicle 2 is provided with a vehicle motion sensor group 11 that detects speed, acceleration, angular speed and the like of the vehicle 2, and the vehicle motion sensor group 11 outputs a sensor signal (A). The vehicle 2 is also provided with an environment sensor group 12 such as a camera, a radar, and a LiDAR scanner and the like.

The signal from the environment sensor group 12 and the sensor signal (A) from the vehicle motion sensor group 11 are input to the autonomous driving control unit 13. The autonomous driving control unit 13 controls the accelerator 14, the brake 15, the steering angle 16, and the like based on these signals. Then, the vehicle information such as the accelerator 14, the brake 15, the steering angle 16, the load amount 17, and the consumption electric power 18 is input to an eco-driving activity evaluation unit of the in-vehicle device 3, which will be described later.

Furthermore, the vehicle 2 is provided with a location calculation unit 19. The location calculation unit 19 receives map information 20 and GPS information 21 in addition to the sensor signal (A) from the vehicle motion sensor group 11, and detects the current location of the subject vehicle based on them. Therefore, the location detection function is provided by the location calculation unit 19 and the like. The location information output from the location calculation unit 19 is input to the in-vehicle device 3. Here, the location information is also input to the autonomous driving control unit 13.

Furthermore, the vehicle 2 is provided with a smart device communication unit 10 capable of communicating with the smartphone 4 and the wearable device 5, and is also provided with an in-vehicle camera 22 for photographing the compartment of the vehicle, that is, the driver and the fellow passenger. The signals from the smart device communication unit 10 and the in-vehicle camera 22 are input to the occupant determination unit 23. The occupant determination unit 23 recognizes the occupant of the vehicle 2, that is, the driver and the fellow passenger, based on these input signals. The occupant information and activity information output from the occupant determination unit 23 are input to the in-vehicle device 3. Here, the occupant information from the occupant determination unit 23 is also input to a cloud communication unit, which will be described later.

Here, the in-vehicle device 3 mainly includes a computer including a CPU and peripheral devices, and has the following configuration according to its hardware configuration and software configuration. That is, the in-vehicle device 3 includes an eco-driving activity evaluation unit 24 as an eco-driving evaluation device, a health care activity evaluation unit 25 as a health care activity evaluation device, and a social contribution activity evaluation unit 26 as a social contribution activity evaluation device. These three activity evaluation units 24, 25, and 26 function as an evaluation device that evaluates the user's activity based on vehicle information or activity information.

Further, the in-vehicle device 3 includes a point determination unit 27 and a point management unit 28. These point determination unit 27 and the point management unit 28 function as a point giving device that gives a point according to the evaluations of the three activity evaluation units 24, 25, and 26. The in-vehicle device 3 includes a recommendation generation unit 29 and a display 30 as a proposal device that proposes activities for which the point is given to the user. Further, the in-vehicle device 3 includes a cloud communication unit 31 for communicating with the management server 6.

The eco-driving activity evaluation unit 24 receives a sensor signal (A), the vehicle information, and the location information. The eco-driving activity evaluation unit 24 evaluates the eco-driving based on the input information according to the travel state of the vehicle 1, and calculates an evaluation value depending on the degree of the eco-driving. The eco-driving can be evaluated based on at least the driver's accelerator work, the power consumption of the vehicle 2, and the load amount. In this embodiment, the recommendation generation unit 29 instructs the driver to perform eco-driving behavior, and the eco-driving activity evaluation unit 24 evaluates the degree of the eco-driving according to the degree of compliance with the instructed driving behavior. At this time, the driving behavior instructed to the driver includes the number of times or the period of high-load operations being less than a threshold value.

The activity evaluation value determined by the eco-driving activity evaluation unit 24 is input to the point determination unit 27 and the recommendation generation unit 29. The point determination unit 27 gives the point to the user according to the activity evaluation value. The point management unit 28 adds up and manages the given point. At this time, the eco-driving is evaluated for each predetermined section which is prepared by dividing with respect to the travel distance of the vehicle 2, and the point is given at the timing when the vehicle 2 passes a predetermined checkpoint that is a separation place of the predetermined section. Further, in the present embodiment, when there is a fellow passenger other than the driver in the vehicle 2, the point determination unit 27 gives a point to all the fellow passenger in addition to the driver. The point given to the fellow passenger is, for example, a half of the point given to the driver.

The location information, the occupant information, and the activity information are input to the healthcare activity evaluation unit 25. The health care activity evaluation unit 25 evaluates whether the user has performed a specific health care activity based on these input signals, and calculates an evaluation value according to the type, time, and the like of the health care activity. At this time, the healthcare activity evaluation unit 25 evaluates that the user has performed a specific healthcare activity based on the cooperation with the application of the smartphone 4. Furthermore, based on the location information of the vehicle 2, the health care activity evaluation unit 25 determines whether the user has performed a specific healthcare activity in a certain case in which the destination where the vehicle 2 has stopped is a place where the health care activity such as running or yoga are performed at a place such as a sports gym, a park, or a mountain trail. Furthermore, the healthcare activity evaluation unit 25 checks that the user has performed a specific healthcare activity based on the user's behavior record information acquired from the wearable device 5.

The activity evaluation value determined by the healthcare activity evaluation unit 25 is input to the point determination unit 27 and the recommendation generation unit 29. The point determination unit 27 gives the point to the user according to the activity evaluation value. The point management unit 28 adds up and manages the given point. At this time, the point is added by the point management unit 28 at the timing when the ignition of the vehicle 2 is turned off and the driver gets off the vehicle.

The location information, the occupant information, and the activity information are input to the social contribution activity evaluation unit 26. The social contribution activity evaluation unit 26 evaluates whether the user has performed a specific social contribution activity based on these input signals, and calculates an evaluation value according to the type, time, and the like of the social contribution activity. At this time, the social contribution activity evaluation unit 26 evaluates that the user has performed a specific social contribution activity based on the cooperation with the application of the smartphone 4. In addition, based on the location information of the vehicle 2, the social contribution activity evaluation unit 26 evaluates that the user has performed a specific social contribution activity based on the place where the destination of the vehicle 2 is a place where social contribution activities are performed, such as a volunteer venue.

The activity evaluation value determined by the social contribution activity evaluation unit 26 is input to the point determination unit 27 and the recommendation generation unit 29. The point determination unit 27 gives the point to the user according to the activity evaluation value. The point management unit 28 adds up and manages the given point. At this time, the point is added by the point management unit 28 based on information obtained from the smartphone 4 indicating that the user has completed a specific social contribution activity.

As described above, the point determination unit 27 calculates point information to be given to the user based on the evaluation values input from the eco-driving activity evaluation unit 24, the healthcare activity evaluation unit 25, and the social contribution activity evaluation unit 26, and transmits the addition point information to the point management unit 28. The point management unit 28 manages the user's points and also sets a determination standard setting for the point determination unit 27. Then, the point management unit 28 transmits the point information given to the user to the management server 6 via the cloud communication unit 31, and causes the management server 6 to record the point information.

Then, the recommendation generation unit 29 generates information of activity for which the point is given, and displays the information on the display 30, for example, when the ignition of the vehicle 2 is turned on, thereby proposing the activity to the user. In this embodiment, the activities in three categories: eco-driving, healthcare activities, and social contribution activities are proposed. As described above, the recommendation generation unit 29 instructs the driver on the driving behavior regarding the eco-driving. Furthermore, in the case of the health care activity and the social contribution activity, the recommendation generation unit 29 proposes to the user the activity that is held at a place close to the current location of the vehicle 2 and that can accumulate more points.

At this time, the activity in a category that the user performs less frequently may be proposed to the user. Furthermore, the activity that spans multiple categories may be proposed, and in particular, it is also possible to propose to the driver the health care activity at a location where the driver has performed the social contribution activity. The display 30 also displays information such as the current number of points accumulated. Here, as the display 30, for example, a center display provided at the center of an instrument panel is used. This center display is provided with a touch panel, and the user performs various input and instruction operations.

The cloud communication unit 31 transmits information about each user, their point information, activity history information, and the like to the management server 6 by communicating with the management server 6. The management server 6 records and manages the above information. Furthermore, as described above, the management server 6 performs point return processing, for example, via another collaborate cloud service, according to the user's request. Specifically, it is possible to plant trees, to discount a fee of a gym, and to donate to a support NGO using the point.

Figure 2:
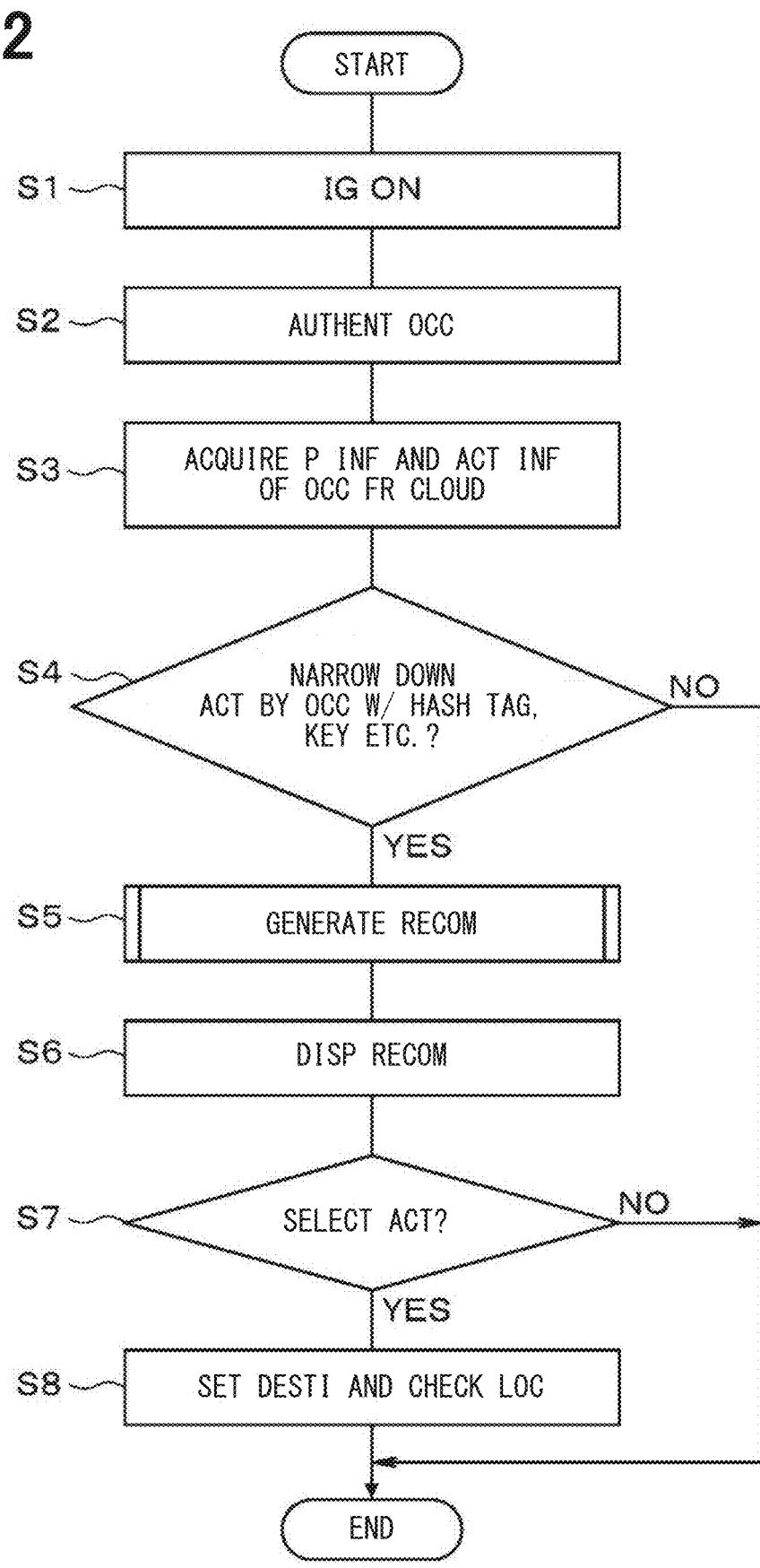
FIG. 2 is a flowchart showing the processing procedure for proposing activities to the user.
Figure 3:
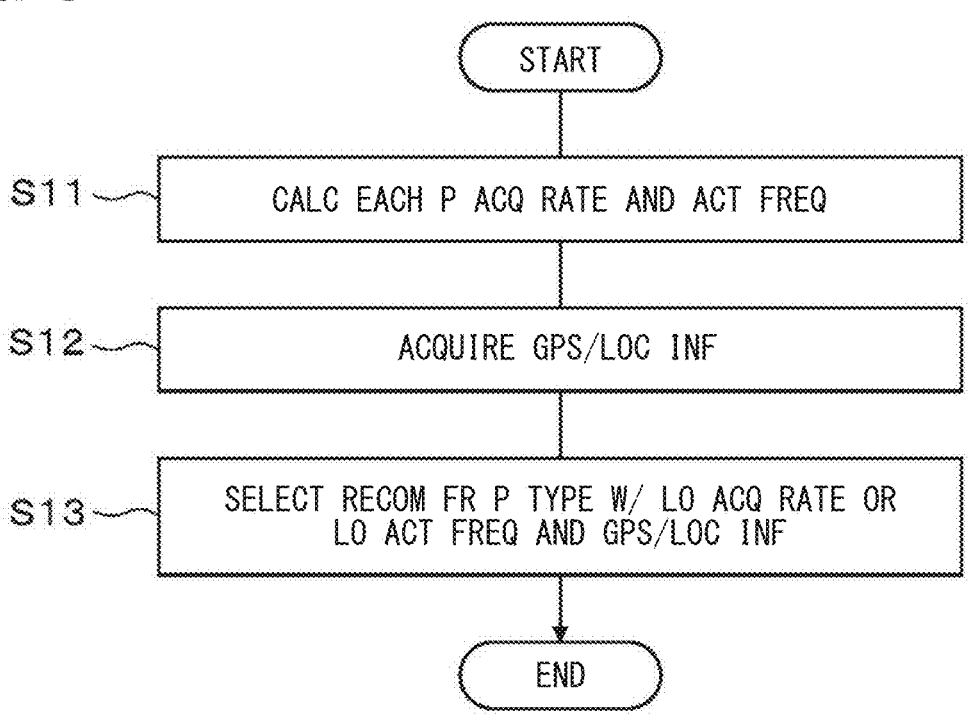
FIG. 3 is a flowchart showing the detailed processing procedure of step S5 in FIG. 2.

Next, the process executed by the in-vehicle device 3 in the point management system 1 having the above configuration will be described with reference to FIGS. 2 to 7 as well. The flowchart in FIG. 2 shows a processing procedure related to proposing an activity to the user, which is executed in the in-vehicle device 3 when the ignition is turned on. Further, the flowchart in FIG. 3 shows the detailed procedure of the process in step S5 in FIG. 2. That is, when the ignition is turned on in step S1, the occupants, that are, the driver and the fellow passenger, are authenticated in the next step S2. This authentication is performed, for example, based on images captured by the in-vehicle camera 22.

In step S3, passenger point information and activity history information are acquired from the management server 6 via the cloud. Then, in step S4, a selection screen for an activity that the user wants to perform from now on is displayed on the display 30, and the user narrows down the activities that the user wants to perform by inputting genres, hashtags, keywords, and the like. If the user does not perform any activity ("No" in step S4), the process ends. When the activities that the user wants to perform are narrowed down ("YES" in step S4), the recommendation generation unit 29 generates a recommendation in step S5.

FIG. 3 shows the detailed procedure of recommendation generation in step S5. Here, first, in step S11, the point acquisition rate and the activity frequency of each activity are determined from the activity history. In the next step S12, the current location of the vehicle 2 is determined. Then, in step S13, a plurality of recommended activities are selected based on the point acquisition rate, the activity frequency, and the current location of the vehicle. More specifically, a predetermined number of activities that are held at places close to the current location, the number of an activity starting from 1 is assigned in order of closest, further, the number of an activity is additionally assigned in order of the acquired point from a low genre to a high genre, and furthermore, the number of an activity is additionally assigned in order of popularity from high to low. The predetermined number of activities are recommended in order of the total numerical value of the activity from low to high.

When the recommendation generation process is completed, returning to FIG. 2, recommended activities are displayed on the display 30 in step S6. The user looks at the recommendation, and selects an activity in the next step S7. If no activity is selected ("NO" in step S7), the process ends. If an activity is selected ("YES" in step S7), the location of the selected activity is set as the destination in step S8, and route guidance by the navigation system with the destination and check points set is started. Here, when generating the above-described recommendation, it is also possible to use the user's favorite activities as recommendations, or to generate recommendations in order of the number of points that can be acquired.

Figure 4:
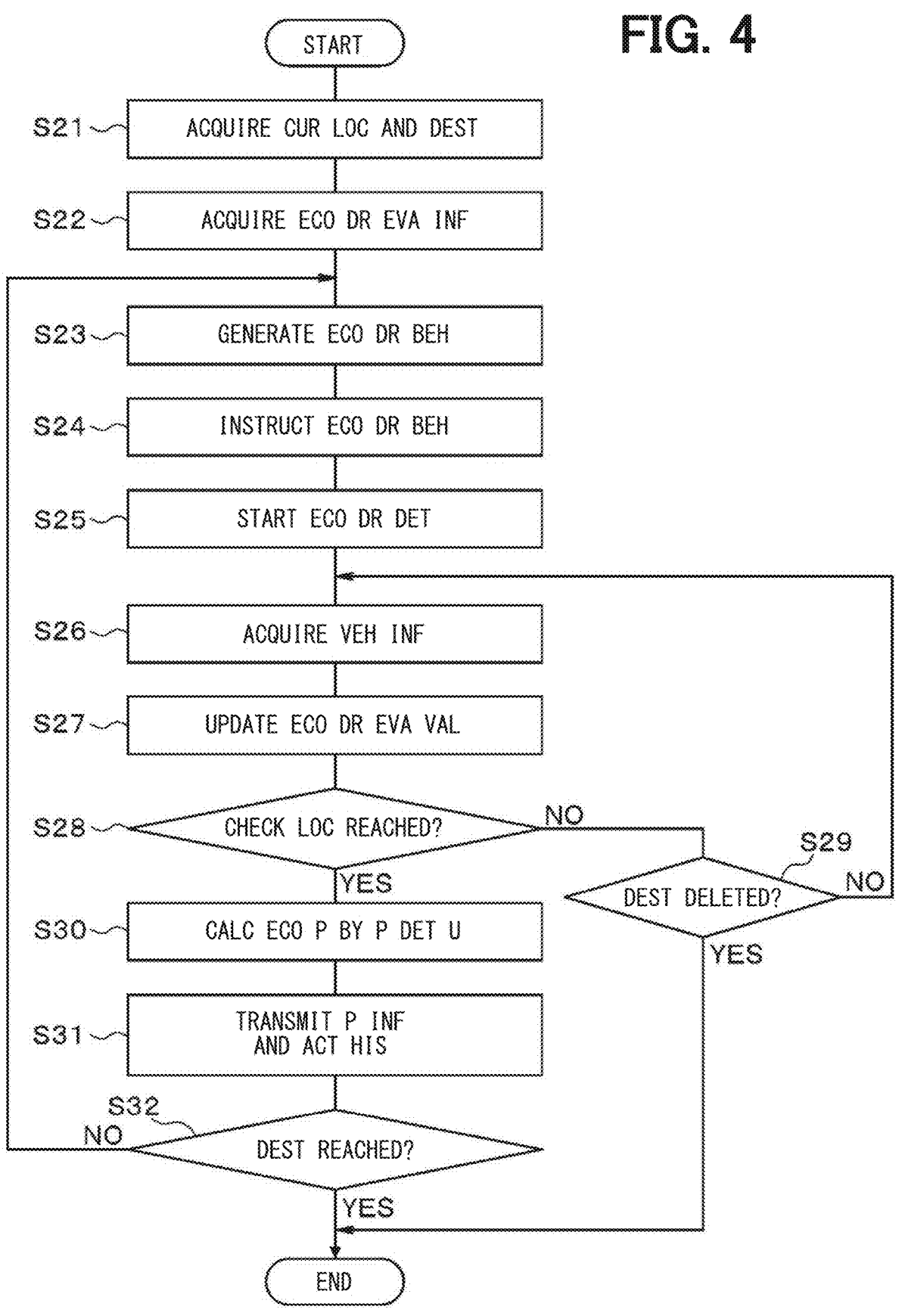
FIG. 4 is a flowchart showing the processing procedure for evaluating eco-driving and giving a point.

Next, the flowchart of FIG. 4 shows a processing procedure for evaluating the eco-driving and giving the point, which is executed by the in-vehicle device 3 when the driver performs the eco-driving to the destination. First, in step S21, the current location and the destination of the vehicle 2 are acquired, and in step S22, the eco-driving evaluation information is acquired from the past driving history information of the driver. In step S23, the recommendation generation unit 29 generates driving behavior suitable for the eco-driving, and in step S24, the driver is instructed to take the eco-driving behavior, for example, by a display on the display 30.

This driving behavior includes the driver's accelerator work, the power consumption of the vehicle 2, the load amount, and the like, and may also include as the driving behavior that the number or the period of high-load operations such as sudden braking, sudden starts, and sudden steering is less than the threshold value. Furthermore, the driving behavior may include information about the next checkpoint, advice, and expected points to be acquired. In this case, checkpoints are set, for example, every time the vehicle travels a certain distance from the current location to the destination, and checkpoints can also be set, for example, at rest areas such as service areas. The destination is the final checkpoint.

In step S25, the eco-driving activity evaluation unit 24 starts determining the eco-driving. In step S26, information such as vehicle information is acquired, and in step S27, the eco-driving activity evaluation value is updated. In step S28, it is determined whether the next check point has been reached. If the check point has not been reached ("NO" in step S28), it is determined in the next step S29 whether the destination has been deleted. If the destination has been deleted ("YES" in step S29), the process ends. If the destination has not been deleted ("NO" in step S29), the processing from step S26 is repeated.

If the check point has been reached ("YES" in step S28), in the next step S30, the point for the eco-driving from the previous check point or the starting point to the current check point is calculated in the point determination unit 27, and then, the point is added by the point management unit 28. In the next step S31, the cloud communication unit 31 transmits the point information and the behavior history information to the management server 6 on the cloud and stores them. In step S32, it is determined whether the vehicle 2 has reached the destination, and if it has reached ("YES" in step S32), the process ends. If the destination has not been reached yet ("NO" in step S32), the process from step S23 is repeated for the next section.

Figure 5:
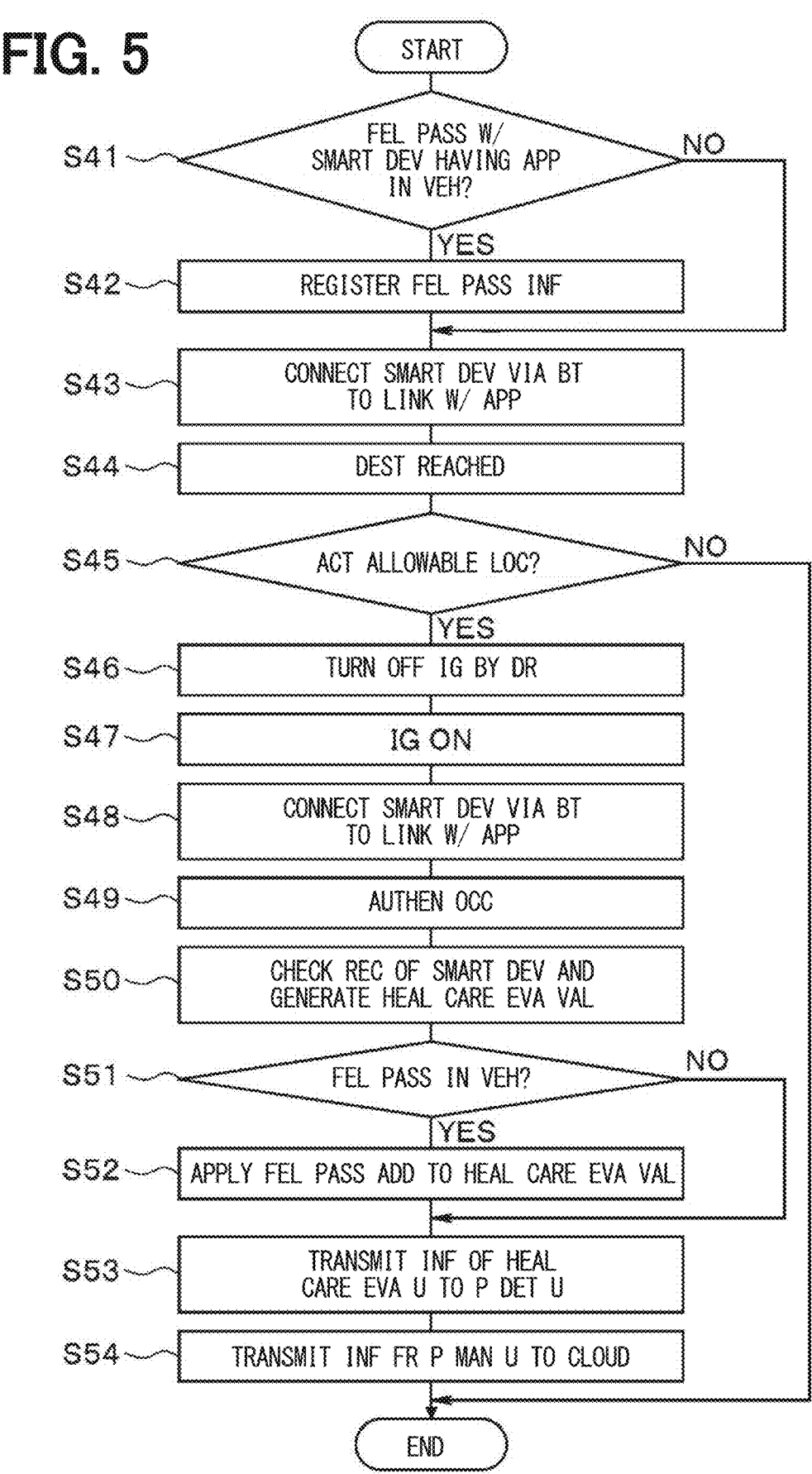
FIG. 5 is a flowchart showing the processing procedure for evaluating healthcare activities and giving a point.

The flowchart in FIG. 5 shows the procedure of the process of evaluating the health care activity and giving points, which is executed by the in-vehicle device 3 when the user goes to a destination place by the vehicle 2 and performs the health care activity. First, in step S41, it is determined whether there is a fellow passenger in the vehicle 2 in addition to the driver, and whether or not the fellow passenger has a smart device 4, 5 having the health care application 8. If there is a fellow passenger is disposed in the vehicle 2 and the fellow passenger carries the smart devices 4 and 5 ("YES" in step S41), fellow passenger information is registered in the next step S42. If the fellow passenger is not disposed in the vehicle 2, or if the fellow passenger does not carry the smart device 4 or 5 even when the fellow passenger is disposed in the vehicle 2 ("NO" in step S41), the process directly proceeds to step S43.

In the next step S43, the smart device communication unit 10 of the vehicle 2 connects with the smart devices 4 and 5 of the driver and the fellow passenger, and cooperates with the healthcare application 8. When the vehicle 2 reaches the destination in step S44, it is determined in step S45 whether or not that the location is a place where the health care activity can be performed. If the reached location is not a place where the health care activity can be performed ("NO" in step S45), the process ends. If the reached location is a place where the health care activity can be performed ("YES" in step S45), the ignition is turned off by the driver in step S46. Thereafter, the driver and the fellow passenger leave the vehicle 2 to perform the health care activity, then return to the vehicle 2, and when the ignition is turned on in step S47, the process from step S48 is performed.

In the next step S48, the smart device communication unit 10 of the vehicle 2 connects with the smart devices 4 and 5 of the driver and the fellow passenger, and cooperates with the healthcare application 8. In the next step S49, the occupants, that are, the driver and the fellow passenger, are authenticated. Then, in step S50, a healthcare evaluation value is generated in the healthcare activity evaluation unit 25 by comparing the records of the smart devices 4 and 5. In step S51, it is determined whether or not there is a fellow passenger in the vehicle 2, and if there is a fellow passenger ("YES" in step S51), the point addition is applied with respect to the fellow passenger in step S52. If there is no fellow passenger in the vehicle 2 ("NO" in step S51), the process directly advances to step S53.

In step S53, the healthcare evaluation value is transmitted to the point determination unit 27, the point is calculated, and the point management unit 28 performs the addition of the point and records the point. In this case, if there is a fellow passenger in the vehicle 2, the point is also added to the fellow passenger. In this case, the fellow passenger is given fewer points than the driver, for example, a half of the point is given to the fellow passenger, and if there are multiple fellow passengers in the vehicle 2, the points are given to all the fellow passengers. In the next step S54, the cloud communication unit 31 transmits the point information and the behavior history information to the management server 6 on the cloud and stores them, and then, the process ends.

Figure 6:
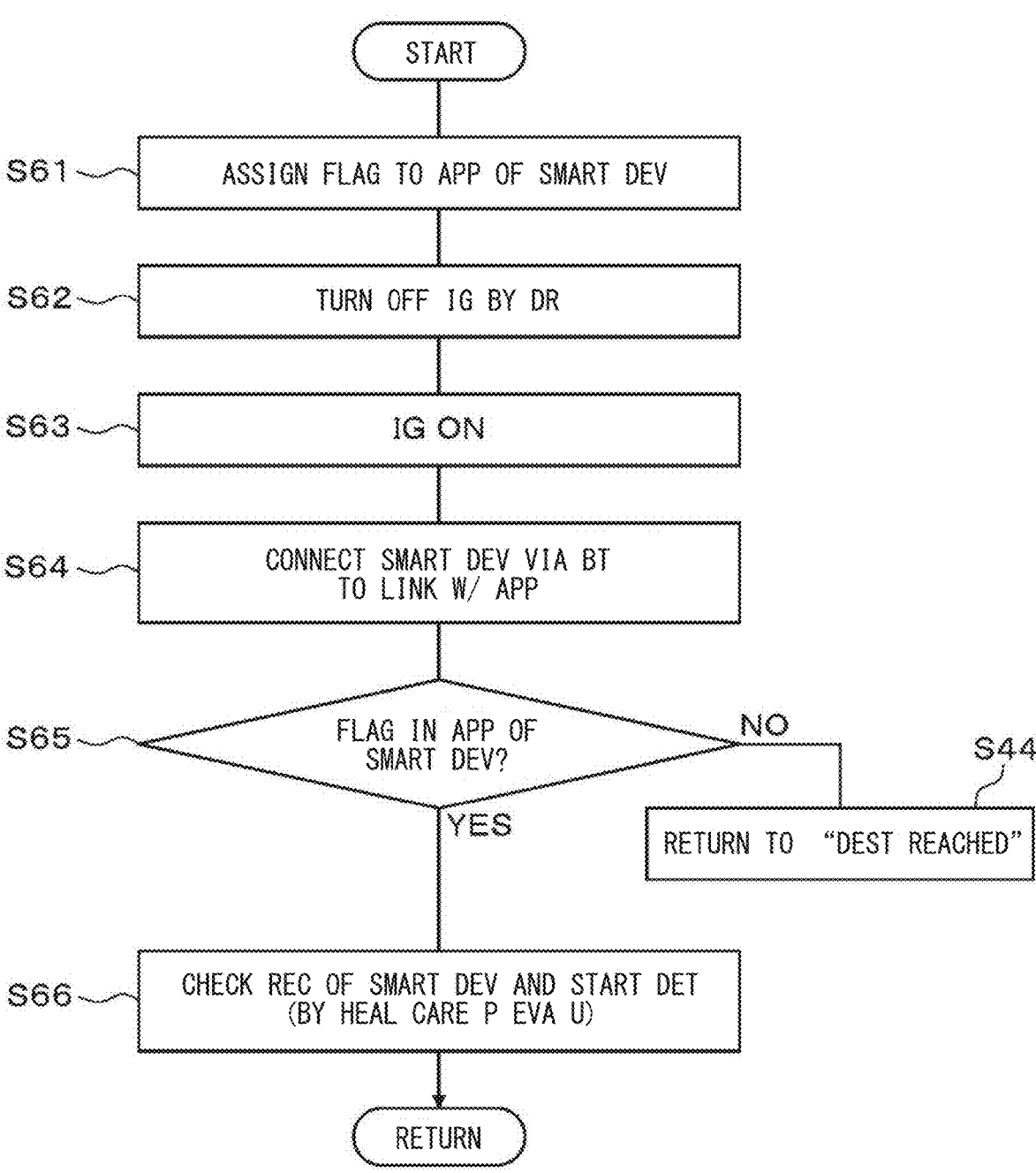
FIG. 6 is a flowchart showing a processing procedure for preventing collaborate data from disappearing when the ignition is turned off.

Here, the flowchart in FIG. 6 shows the details of the processing procedure to prevent the cooperation data from disappearing even if the ignition is turned off in step S46 after arriving at the destination in step S44 in FIG. 5. That is, upon arrival at the destination, a flag is assigned to the applications on the smart devices 4 and 5 in step S61. When the ignition is turned off by the driver in step S62 and then turned on in step S63, the smart device communication unit 10 is connected to the smart devices 4 and 5 of the driver and the fellow passenger in step S64, and cooperates with the healthcare application 8.

Then, in step S65, it is determined whether the applications on the smart devices 4 and 5 have a flag. If there is a flag ("YES" in step S65), a healthcare evaluation value is generated in the healthcare activity evaluation unit 25 by comparing the records of the smart devices 4 and 5 in step S50. On the other hand, if there is no flag ("NO" in step S65), the process returns to "destination reached" in step S44 of the flowchart in FIG. 5.

Figure 7:
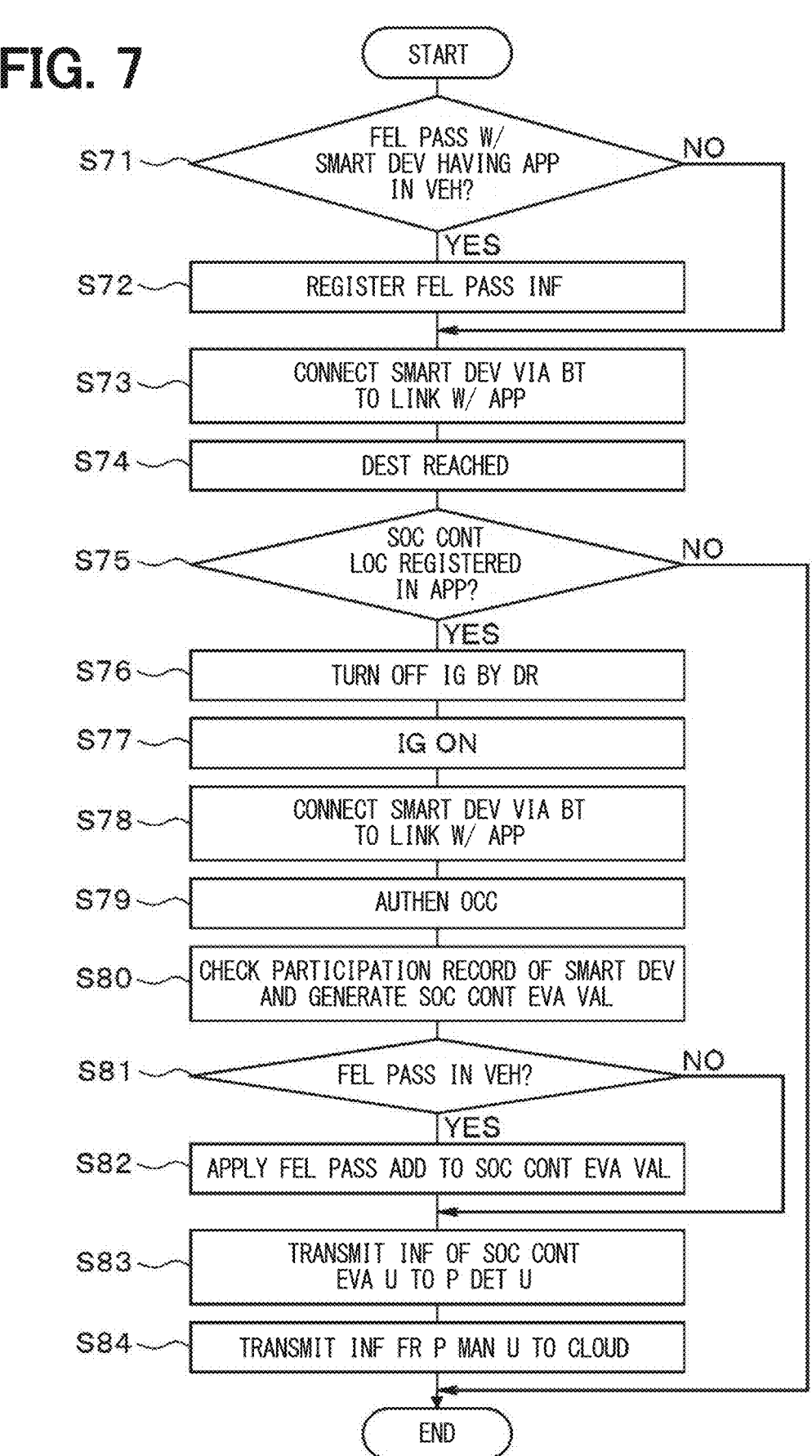
FIG. 7 is a flowchart showing the processing procedure for evaluating social contribution activities and giving a point.

The flowchart in FIG. 7 shows the procedure of the process of evaluating the social contribution activity and giving points, which is executed by the in-vehicle device 3 when the user goes to a destination place by the vehicle 2 and performs the social contribution activity. First, in step S71, it is determined whether there is a fellow passenger in the vehicle 2 in addition to the driver, and whether or not the fellow passenger has a smart device 4, 5 having the social contribution application 9. If there is a fellow passenger is disposed in the vehicle 2 and the fellow passenger carries the smart devices 4 and 5 ("YES" in step S71), fellow passenger information is registered in the next step S72. If the fellow passenger is not disposed in the vehicle 2, or if the fellow passenger does not carry the smart device 4 or 5 even when the fellow passenger is disposed in the vehicle 2 ("NO" in step S71), the process directly proceeds to step S73.

In the next step S73, the smart device communication unit 10 of the vehicle 2 connects with the smart devices 4 and 5 of the driver and the fellow passenger, and cooperates with the social contribution application 9. When the vehicle 2 reaches the destination in step S74, it is determined in step S75 whether or not that the location is a place where a social contribution activity registered in the application can be performed. If it is not a place where a social contribution activity can be performed ("NO" in step S75), the process ends. If it is a place where a social contribution activity can be performed ("YES" in step S75), the ignition is turned off by the driver in step S76. After this, the driver and the fellow passenger leave the vehicle 2 and perform the social contribution activity. In this case, when the social contribution activity is completed, a proof that the social contribution activity has been carried out is attached to the social contribution application 9. Thereafter, when returning to the vehicle 2 and turning on the ignition in step S77, processing from step S78 is performed.

In step S78, the smart device communication unit 10 of the vehicle 2 connects with the smart devices 4 and 5 of the driver and the fellow passenger, and cooperates with the social contribution application 9. In the next step S79, the occupants, that are, the driver and the fellow passenger, are authenticated. Then, in step S80, a social contribution evaluation value is generated by the social contribution activity evaluation unit 26 by comparing the records of the smart devices 4 and 5. In step S81, it is determined whether or not there is a fellow passenger in the vehicle 2, and if there is a fellow passenger ("YES" in step S81), the point addition is applied with respect to the fellow passenger in step S82. If there is no fellow passenger in the vehicle 2 ("NO" in step S81), the process directly advances to step S83.

In step S83, the social contribution evaluation value is transmitted to the point determination unit 27, the point is calculated, and the point management unit 28 performs the addition of the point and records the point. In this case, if there is a fellow passenger in the vehicle 2, the point is also added to the fellow passenger. In this case, the fellow passenger is given fewer points than the driver, for example, a half of the point is given to the fellow passenger, and if there are multiple fellow passengers in the vehicle 2, the points are given to all the fellow passengers. In the next step S84, the cloud communication unit 31 transmits the point information and the behavior history information to the management server 6 on the cloud and stores them, and then, the process ends. Regarding the above point return, for example, it may be preferable to set various options, in addition to acquire products and receive services according to the point, such as tree planting, gym discount, health insurance deduction, and donation to a support NGO using the point.

According to the point management system 1 of this embodiment as described above, the following operations and effects can be obtained. That is, in the point management system 1 configured as described above, the recommendation generation unit 29 proposes activities for which the point will be given to the user. Then, when the user performs the specific activity using the vehicle 2 as a contact point, the evaluation units 24, 25 and 26 of the activities evaluate the activity of the user based on the vehicle information according to the travel state of the vehicle 2 or the activity information recorded in the smart devices 4, 5. The point corresponding to the evaluation is given by the point determination unit 27. At this time, the specific activity includes at least one of three categories of the eco-driving activity, the health care activity, and the social contribution activity.

Therefore, since the point is given and accumulated by performing the specific activity proposed to the user, the point management system provides sufficient motivation for the user to encourage the eco-driving activity, the health care activity, and the social contribution activity. In this case, for example, it is possible to recommend a social activity in a wide range that affects a lifestyle of the user, rather than a limited range of services provided by one company. As a result, it is possible to obtain an excellent effect that the point management system 1 can effectively enhance awareness of the eco-driving activity, the healthcare activity, the social contribution activity, and the like to the user of the vehicle 2.

At this time, in this embodiment, since the activity evaluation units 24, 25, 26 of the activities, the point determination unit 27, and the point management unit 28 are provided in the in-vehicle device 3, the in-vehicle device 3 calculates and assigns the point in real time, so that it is possible to perform prompt processing and notify the user. In addition, since the point information to be given to the user is transmitted to the management server 6 and recorded, the point management and subsequent return can be performed by the management server 6 as a main device, so that the point management, the point return and the like are processed reasonably. Since the in-vehicle device 3 cooperates with the management server 6 to grasp the current number of points acquired by the user, the user of the vehicle 2 can easily check the current number of points on the in-vehicle device 3 side.

Furthermore, by configuring the recommendation generation unit 29 to propose the activity that will earn the user more points, more effective proposal can be made. Since the in-vehicle device 3 proposes the activity to the user at the timing when the ignition of the vehicle 2 is turned on, it is possible to make effective proposal, for example, to a user who has not clearly determined a destination. At this time, by proposing the activity that spans multiple categories to the user, it is possible to make more effective proposal, for example, for performing the health care activity at a place where a social contribution activity has been performed.

In addition, in this embodiment, the recommend behavior related to the eco-driving is proposed to the user, and when the driver as the user performs the eco-driving, the eco-driving activity evaluation unit 24 evaluates the degree of the eco-driving according ton the driving state of the vehicle 2, and the point will be given according to the evaluation. Therefore, the user can be sufficiently motivated to perform the eco-driving, and it is possible to effectively enhance awareness of the eco-driving to the user of the vehicle 2.

In this case, the eco-driving activity evaluation unit 24 evaluates the degree of the eco-driving according to at least the driver's accelerator work, the power consumption of the vehicle 2, and the load amount of the vehicle 2, so it is possible to recommend the eco-driving that improves fuel efficiency and is good for the environment. Appropriate accelerator work improves the fuel efficiency, and by keeping the power consumption low and reducing the load amount, it is possible to improve the fuel efficiency. Furthermore, after instructing the driving behavior to the driver, the eco-driving activity evaluation unit 24 evaluates the degree of the eco-driving according to the degree of compliance with the instructed driving behavior, and therefore, by instructing the appropriate driving behavior, it is possible to recommend the eco-driving, which is good for the environment.

At this time, the driving behavior instructed to the driver includes a behavior that the number of times or the period of the high-load operation is less than the threshold, so that the high-load operation such as sudden acceleration, sudden braking, and sudden steering is restricted to be low, and it is possible to recommend the eco-driving, which is good for the environment. In this embodiment, the point regarding the eco-driving is given at the timing when the vehicle 2 passes a predetermined checkpoint. By setting a separation place of the section as the checkpoint, it is easier to process the evaluation and assignment of the point, and it is easy for the user to judge, so that, for example, the user can switch the mind of the user at the checkpoint, and it is easy for the user to promote the eco-driving.

In this embodiment, the recommend healthcare activity is proposed to the user, and when the user performs a specific healthcare activity, the healthcare activity evaluation unit 25 evaluates that the user has performed the healthcare activity, and the point will be given according to the evaluation. Therefore, by performing the proposed health care activity, the point is given to the user and the point is accumulated, so that it is possible for the user to provide the sufficient motivation to perform the health care activity. As a result, the system can effectively enhance the awareness of the healthcare activity to the user of the vehicle 2.

At this time, based on the location detection function of the vehicle 2, when the destination of the vehicle 2 is a place where a health care activity is to be performed, it is possible to evaluate the performance of the specific health care activity for the user with a certain degree of certainty since the system evaluates that the user has performed a specific health care activity. The health care activity evaluation unit 25 evaluates whether the user has performed a specific health care activity based on the cooperation with the applications of the smart devices 4 and 5, so it is possible to detect an activity that cannot be evaluated by the in-vehicle device 3 alone, and it is possible to more reliably evaluate the healthcare activity performed by the user. In this case, since it is checked that the user has performed a specific healthcare activity based on the user's behavior record information obtained from the smart devices 4 and 5, it is possible to more reliably evaluate that the user has performed the specific healthcare activity.

The in-vehicle device 3 is configured to transmit the point information to be given to the user to the management server 6 and record the point information at the timing when the ignition of the vehicle 2 is turned off and the driver gets off the vehicle, so that the point information to be given to the user can be transmit to the management server 6 at an appropriate timing and the latest point information can be recorded promptly. By proposing the healthcare activity to the user at the place where the social contribution activity has been performed, the user's awareness of both the social contribution activity and the healthcare activity can be increased. Furthermore, in this embodiment, the point is given to the fellow passenger of the vehicle in addition to the driver, so the fellow passenger can also enjoy accumulating the point, and it is possible to further encourage the health care activity.

In this embodiment, the recommended social contribution activity is proposed to the user, and when the user engages in a specific social contribution activity, the social contribution activity evaluation unit 26 evaluates that the user has performed the social contribution activity, and gives the point according to the evaluation. Therefore, by performing the proposed social contribution activity, the point is given to the user and the point is accumulated, so that it is possible for the user to provide the sufficient motivation to perform the social contribution activity. As a result, the system can effectively enhance the awareness of the social contribution activity to the user of the vehicle.

At this time, based on the location detection function of the vehicle 2, it is evaluated that the user has performed a specific social contribution activity based on the feature that the destination of the vehicle 2 is a place where the social contribution activity can be performed, so that it is possible to detect with a certain degree of certainty whether or not the user performs the social contribution activity. In particular, in this embodiment, the social contribution activity evaluation unit 26 is configured to evaluate whether the user has performed a specific social contribution activity based on cooperation with the applications of the smart devices 4 and 5. As a result, it is possible to detect activity that cannot be evaluated by the in-vehicle device 3 alone, and it is possible to more reliably evaluate the social contribution activity performed by the user.

In the above embodiment, the system is configured to cover all three categories of specific activities: the eco-driving, the healthcare activity, and the social contribution activity as the specific activity. Alternatively, the system may be configured to assign and manage the point to one of or two of three categories as the specific activity. Further, in the above embodiment, the in-vehicle device 3 is provided with an evaluation device and a proposal device, alternatively, the management server may be provided with a recommendation function and a function to calculate the point, and the in-vehicle device acquire data of information from the management server. The vehicle is not limited to an automotive vehicle, alternatively, the vehicle may be a truck, a motorcycle, and the like. Furthermore, it is possible to modify a method for returning the point to be various ways such as allocation for payment of social insurance premium using the point, acquisition of benefit of discounts or services, and the like.

Further, in the above embodiment, recommended behavior regarding the eco-driving is proposed, and when the driver as the user performs the eco-driving, the point is given to the driver according to the evaluation. On the other hand, if the driver does not perform the eco-driving, or if the driver disturbs other drivers around the vehicle such as starting slowly, repeatedly stopping and starting, repeatedly decelerating suddenly and create a traffic congestion, it may be possible to perform other controls. As another control, it may be possible to display a comparison of fuel costs and points to be earned, or to display differences in discount rates for services, depending on whether the driver is performing the eco-driving or not. It may be also possible to present to encourage the eco-driving such as lower insurance premiums if the driver performs the eco-driving, or to provide individual guidance on how to perform the eco-driving to drivers who are unable to perform the eco-driving.

(2) Second Embodiment

Figure 8:
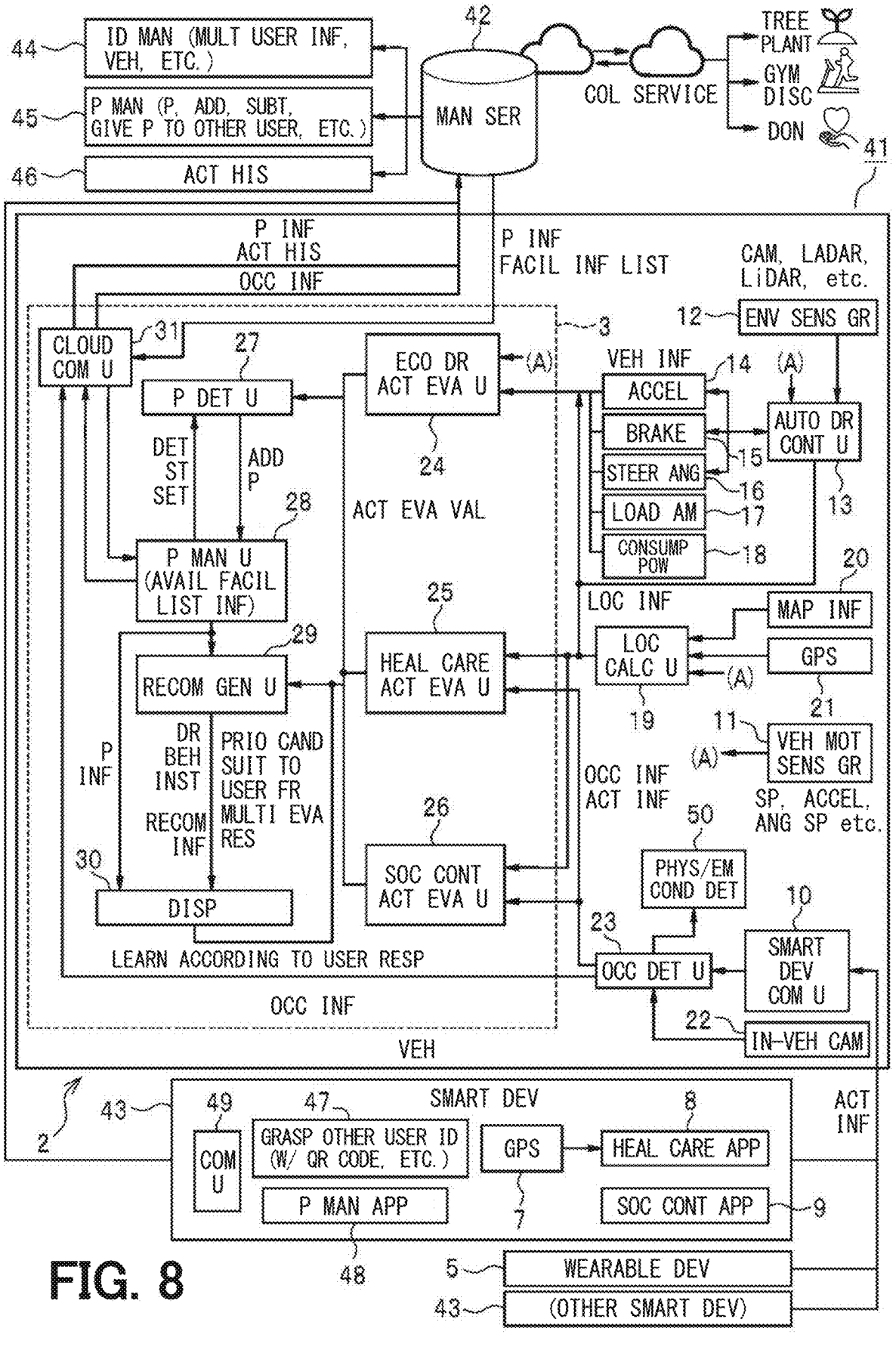
FIG. 8 is a block diagram showing a schematic overall configuration of a point management system according to a second embodiment.

Next, a second embodiment will be described with reference to FIGS. 8 to 13. FIG. 8 schematically shows the overall configuration of a point management system 41 according to the present embodiment. Here, in the first embodiment, the feature related to the giving system of the point is specifically described. In the second embodiment, various measures are mainly provided regarding the utilization of the point. Hereinafter, the same reference numerals will be used for parts equivalent to those in the first embodiment, and new explanations will be omitted, and points different from the first embodiment will be mainly described.

As shown in FIG. 8, the point management system 41 according to the present embodiment is configured to include a management server 42, an in-vehicle device 3 mounted on a vehicle 2 such as an automotive vehicle, a smartphone 43 as a smart device carried by a user, and a wearable device 5 of the user. At this time, the smartphone 43 is provided with a communication unit 49 that communicates with the management server 42. Here, in this embodiment, the user is not necessarily limited to the person who is driving the vehicle 2, but may also include all users who carry the smartphone 43 and register the ID, such as a family member or a friend of the driver, as shown in FIG. 8 as "other smart device 43".

The management server 42 is configured as a cloud management server, and records and manages point assignment, point addition, point return, point transfer, point conversion, and the like for each user. At this time, the management server 42 includes an ID management unit 44, a point management unit 45, and an activity history storage unit 46. Among them, the ID management unit 44 stores an ID for point management that is set and registered for each user or each vehicle. At this time, in this embodiment, multiple users or multiple vehicles 2 can register the same ID. This makes it possible for a plurality of users or a plurality of vehicles 2, such as family members or friends, to be linked to one ID, and points can be used all at once or in a shared manner.

The point management unit 45 manages the use of points for each user or each vehicle 2 based on the above-described ID. At this time, the total possession points of all users or all vehicles 2 linked to one ID are always managed as the latest information. The activity history storage unit 46 stores a history of activities performed by the user. The management server 42 has a function of acquiring information from a linked external server, and transmitting, to the cloud communication unit 31 of the in-vehicle device 3 and the smartphone 43, a list of facility information for a facility where the point can be used such as gyms and restaurants, point information for the number of points required for use, and the like. As will be described later, the management server 42 is configured to propose to each user to encourage them to use the points that have been given and accumulated.

The smartphone 43 includes a communication unit 49 for communicating with the management server 42 described above, as well as an other user ID grasping unit 47 and a point management application 48. The other user ID identifying unit 47 is configured to grasp data of other users' IDs using, for example, a QR code (registered trademark). In addition, the point management application 48 performs processes such as point use, point transfer, and point conversion into coupons and points of other linked services using the user's smartphone 43, and performs processes such as subtraction and addition of points accordingly. This allows the user to designate another user and transfer some or all of the points the user possesses. Furthermore, the point management application 48 allows the user to check the current number of accumulated points.

Further, the in-vehicle device 3 includes an eco-driving activity evaluation unit 24, a health care activity evaluation unit 25, and a social contribution activity evaluation unit 26 as evaluation devices, as in the first embodiment. Further, the in-vehicle device 3 includes a point determination unit 27 and a point management unit 28 as a point giving device, a recommendation generation unit 29 and a display 30 as a proposal device, and a cloud communication unit 31 for communicating with a management server 42. At this time, as will be described later, in this embodiment, the in-vehicle device 3 displays on the display 30 the list of the point information and the facility information acquired from the management server 42 via the cloud communication unit 31.

The in-vehicle device 3 also includes a physical and emotional condition determination unit 50 that determines the current physical condition and the current emotional condition of the occupant based on information from the occupant determination unit 23. The determination results of the physical and emotional condition determination unit 50 are used for driving assistance, activity proposal, and the like. Furthermore, although a detailed explanation will be omitted, in this embodiment, when proposing an activity to a user, the recommendation generation unit 29 is configured to prioritize the proposal such that a candidate to be proposed matches the feature of the user according to a plurality of evaluation results. At that time, the system is configured to perform learning and change the priority order according to the user's reaction at the time of proposal.

Here, as described in the following flowchart explanation, in this embodiment, the management server 42 configured to perform multiple processes relating to the point usage management in response to a request from a user, such as a process for displaying a list of available facilities, a process for giving the point to another user, and a process for utilizing linked services. Furthermore, in this embodiment, the management server 42 is configured to perform a process for encouraging the user to use the points that have been given and accumulated. The flowchart in FIG. 9 shows an outline of the main processing procedure related to point usage management that is executed by the management server 42 when a user makes a request to the management server 42.

Figure 9:
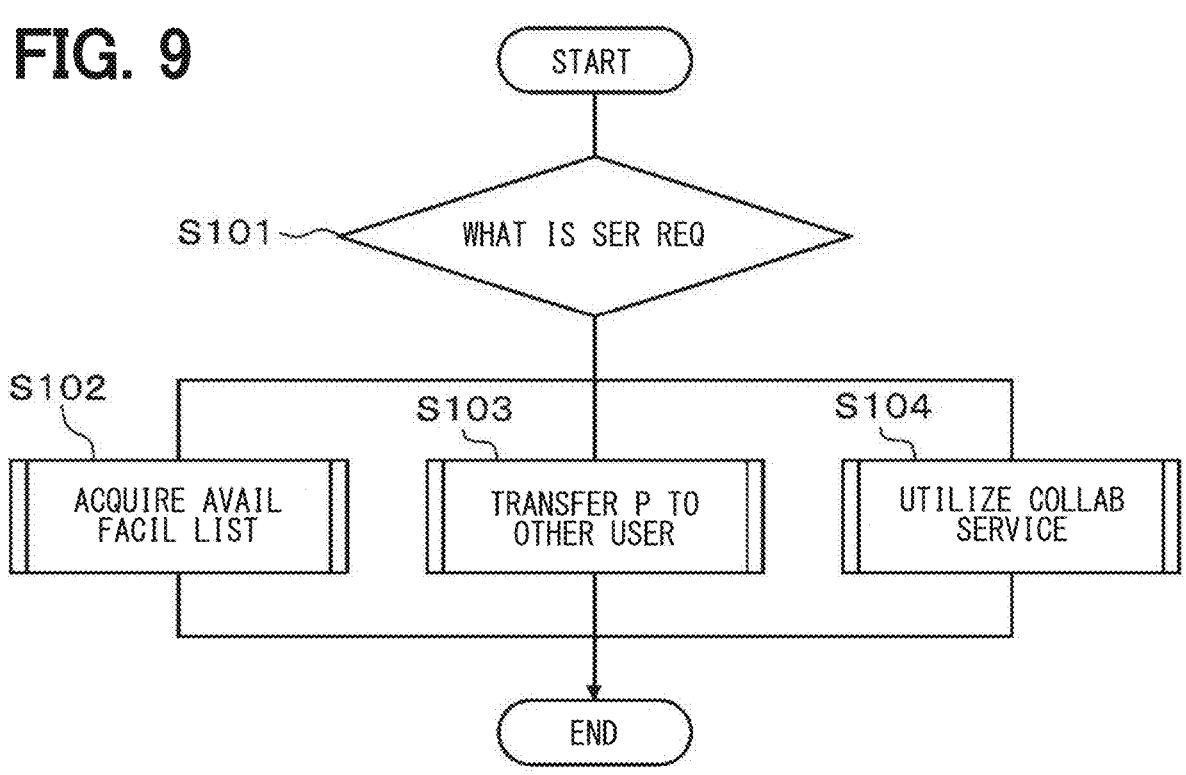
FIG. 9 is a flowchart showing the outline processing procedure related to the point usage management.

In FIG. 9, in step S101, it is determined what the user's request to the management server 42 is. Here, if the request is to acquire the current available facility list, the process of acquiring the available facility list in step S102 is executed. If the request is to transfer a specified number of points to another user, the process of transferring the point to another user in step S103 is executed. If the request is to utilize the linked service, that is, to acquire a predetermined coupon or convert to a point for using another point service, the process of utilizing the linked service in step S104 is executed.

Figure 10:
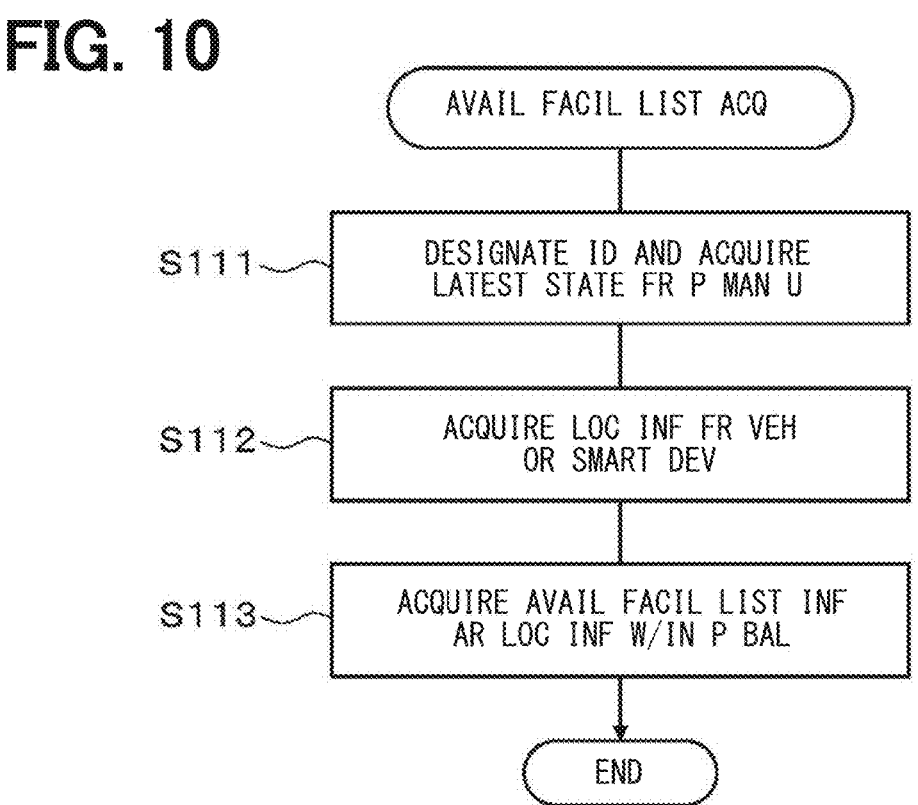
FIG. 10 is a flowchart showing the detailed processing procedure of step S202 in FIG. 9.

The flowchart in FIG. 10 shows details of the process for acquiring the available facility list in step S102 in FIG. 9. Here, in step S111, the latest state of the point is acquired from the point management unit 45 using the user's ID. In step S112, the user's current location information is acquired from the vehicle 2 or the smartphone 43. In step S113, the facility information that can be utilized within the point balance around the user's current location is acquired, the information is transmitted to the user's vehicle 2 or smartphone 43, and the process is ended.

With this feature, the user can acquire the information about the available facility within the latest point balance around the current location of the user such as gyms and restaurants when the user see the display of facility information. Therefore, it is possible to encourage the user to return or use the point to utilize the facility. In this case, the user can acquire the information about facilities that the user has never been to or activities that the user has never experienced. Here, by presenting services that can be provided by accumulating a few more points, the user can be motivated to accumulate the point.

Figure 11:
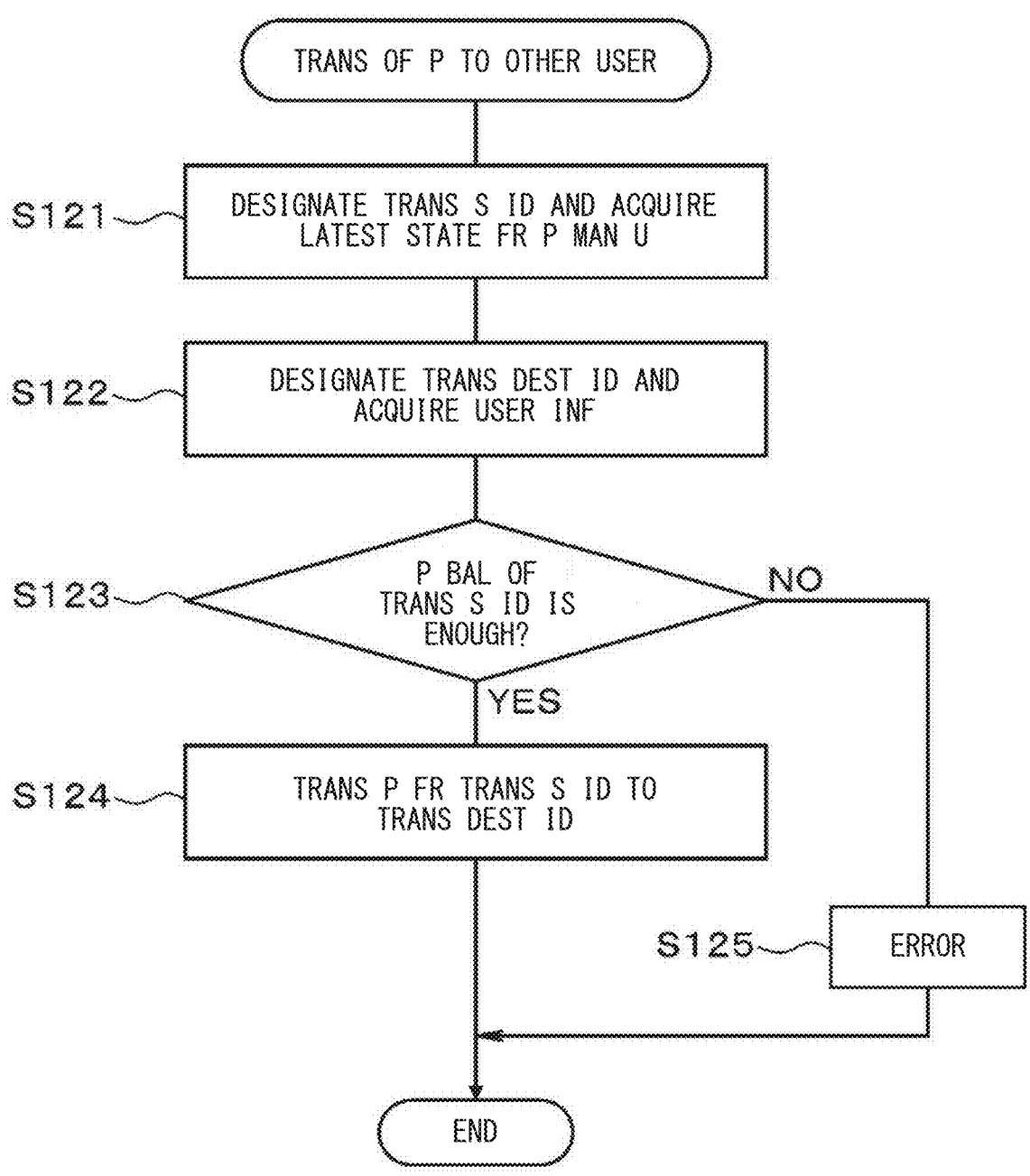
FIG. 11 is a flowchart showing the detailed processing procedure of step S103 in FIG. 9.

Next, the flowchart in FIG. 11 shows the detailed processing procedure for transferring the point to other users in step S103 in FIG. 9. In step S121, the latest status of the point is acquired from the point management unit 45 using the ID of the user of the point transfer source. In step S122, the user information is acquired using the ID of the point transfer destination. In step S123, it is determined whether the point balance of the transfer source ID is sufficient. If the point balance is sufficient ("YES" in step S123), the point is given or transferred in step S124, and the process is ended. If the point balance is insufficient ("NO" in step S123), an error is determined in step S125, and the process is ended.

With this feature, the user can freely transfer the point that the user has acquired to another person. In this case, although not shown, if the point is transferred to another person, the user's point will of course be subtracted accordingly. At that time, for example, if multiple users have registered the same ID, all linked users will be notified of point usage. At this time, the linked user may refuse the point subtraction, and it is possible to suppress the undesired use of the point.

Figure 12:
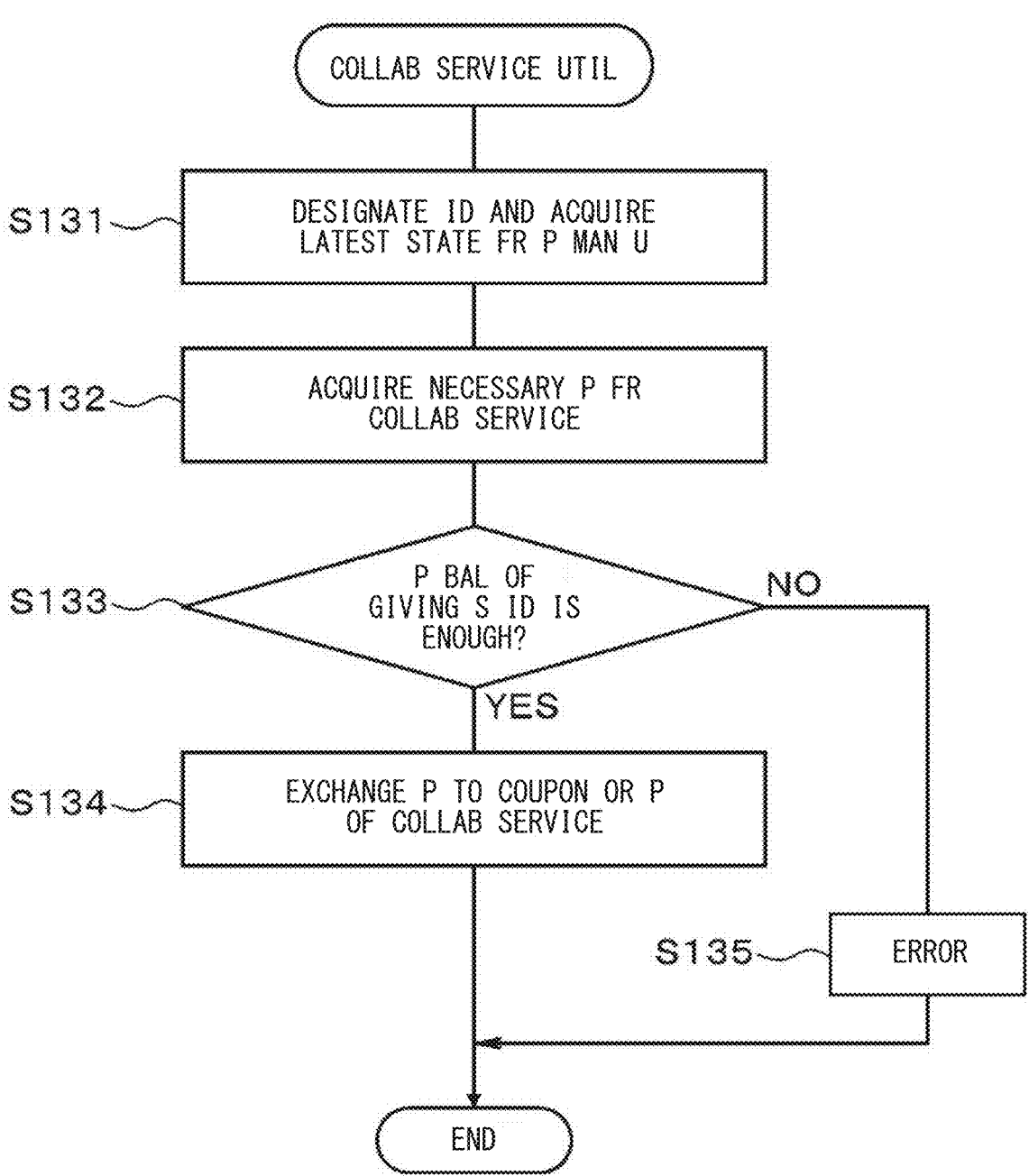
FIG. 12 is a flowchart showing the detailed processing procedure of step S104 in FIG. 9.

The flowchart in FIG. 12 shows the detailed processing procedure for using the collaboration service in step S104 in FIG. 9. Here, in step S131, the latest state of the point is acquired from the point management unit 45 using the user's ID. In step S132, the number of points necessary for acquiring a predetermined coupon or converting to points of another point service is acquired from the collaboration service. In step S133, it is determined whether the user's point balance is sufficient. If the point balance is sufficient ("YES" in step S133), the point is converted into coupons or points for other services in step S134, and the process is ended.

If the point balance is insufficient ("NO" in step S133), an error is determined in step S135, and the process is ended. This makes it possible for the user to convert the accumulated points into coupons or points for other services, and the point return and point use are no longer limited to a limited number of facilities. Therefore, it is easier for the user to use the point, and the user's motivation to accumulate the point can be increased.

Figure 13:
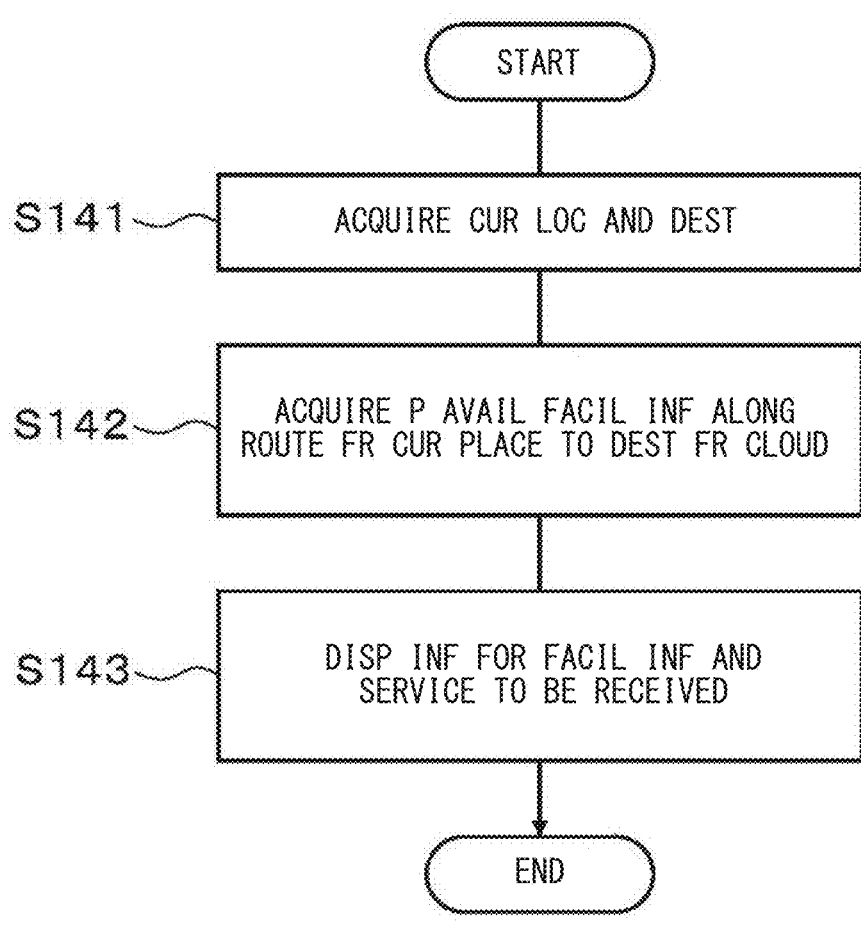
FIG. 13 is a flowchart showing a processing procedure for proposing the use of an obtained point.

Furthermore, the flowchart in FIG. 13 shows a processing procedure executed by the management server 42 to propose the use of acquired points. This proposal may be made upon a request from the user, or may be configured to be made automatically. First, in step S141, the user's location, that is, the location information of the vehicle 2 or the smartphone 43, and the destination information are acquired. In step S142, information on facilities where points can be used around the route from the current location to the destination is acquired from another server or the like. In step S143, the acquired information, that is, the facility information, is displayed on the display and proposed together with information on what kind of services can be received.

This allows the user to know about facilities where points can be used around the current location, thereby further promoting the use of points by the user. In this case, by presenting services that can be provided by accumulating a few more points, the user can be motivated to accumulate the point. Alternatively, the points can be shared among multiple users such as family members, and the points can be added up to a predetermined number of points for use.

According to the point management system 41 of the second embodiment, similar to the first embodiment, the user point is given by performing a specific activity using the vehicle 2 as a contact point, so that it is possible to obtain an excellent effect that the point management system 41 can effectively enhance awareness of the eco-driving activity, the healthcare activity, the social contribution activity, and the like to the user of the vehicle 2. In this embodiment, various measures have been taken regarding the use of points, so it is possible to improve convenience for the user and further increase motivation for activities.

(3) Other Embodiments

Although not described in the above embodiments, the point management system is applicable, as a target vehicle, not only to private cars but also to a car in a car sharing system and a ride sharing system as follows. In other words, a credit score for an user of the car sharing system is calculated based on eco-driving, and the like, and if the credit score is high, the given point or the point return may be increased, or the point may be utilized to the fee of the car sharing system. In the ride sharing system, it is also possible to increase the evaluation of the driver who performs the eco-driving, and to give the point to an excellent driver from a fellow passenger as a reward. It is also possible to evaluate the eco-driving of delivery drivers of logistics companies and give them points, or to give the point from the delivery driver to a customer who cooperates with the delivery driver.

Furthermore, various combinations of the eco-driving, the healthcare activities, and the social contribution activities are possible in addition to those described in the first embodiment above, to serve a dual purpose. At this time, for example, it may be desirable to turn off the air conditioning system for the eco-driving, but there may be cases where the user feels hot or cold and this causes a difficulty for performing the health care activities. In such cases, it may be desirable to propose better content overall. Furthermore, it is also possible to determine the user's satisfaction level from the information of the physical and emotional condition determination unit 50 regarding the social contribution activities and the health care activities, and to reflect this feature in point assignment. In the system, an evaluation device and a point giving device may be provided on the management server side, and a proposal device may also be provided on the management server side. In addition, points may be given at timing other than when the ignition is turned on, such as when the vehicle is stopped or parked. Further, at this time, the timing at which point processing is reflected may be made visible to the user in real time. Although the present disclosure has been made in accordance with the embodiments, it is understood that the present disclosure is not limited to such embodiments and structures. The present disclosure incorporates various modifications and variations within the scope of equivalents. In addition, while the various elements are shown in various combinations and configurations, which are exemplary, other combinations and configurations, including more, less or only a single element, are also within the spirit and scope of the present disclosure.

The control section and the method thereof described in the present disclosure may be realized by a dedicated computer provided by configuring a processor programmed to execute one or a plurality of functions embodied by a computer program and a memory. Alternatively, the control unit and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of (i) a processor and a memory programmed to execute one or more functions and (ii) a processor configured by one or more hardware logic circuits. Furthermore, the computer program may be stored in a computer-readable non-transition tangible recording medium as an instruction executed by a computer.

The present embodiments further include the following features.

Feature [1]: A point management system using a vehicle as a contact point includes: at least one of (i) a circuit and (ii) a processor having a memory storing computer program code. The at least one of the circuit and the processor having the memory is configured to cause the point management system to provide at least one of: an in-vehicle device mounted on the vehicle; a smart device carried by an user of the vehicle and connectable to the in-vehicle device; and a management server that communicates with the in-vehicle device. The point management system gives a point to the user according to a specific activity when the user performs the specific activity using the vehicle as a contact point. The at least one of the circuit and the processor having the memory is configured to cause the point management system to further provide at least one of: an evaluation device that evaluates the specific activity of the user based on vehicle information according to a travel state of the vehicle or activity information recorded in the smart device; a point giving device that gives the point to the user according to an evaluation by the evaluation device; and a propose device that proposes, to the user, an activity for which the point is given. The specific activity includes at least one of three categories of activities: eco-driving, healthcare activity, and social contribution activity.

Feature [2]: In the point management system using the vehicle as the contact point according to the feature [1], the evaluation device and the point giving device are provided in the in-vehicle device.

Feature [3]: In the point management system using the vehicle as the contact point according to the feature [2], the in-vehicle device transmits point information to be given to the user to the management server, and causes the management server to record the point information.

Feature [4]: In the point management system using the vehicle as the contact point according to any one of the features [1] to [3], the in-vehicle device cooperates with the management server to grasp a current number of the point acquired by the user.

Feature [5]: In the point management system using the vehicle as the contact point according to the feature [1], the evaluation device and the point giving device are provided in the management server.

Feature [6]: In the point management system using the vehicle as the contact point according to the feature [5], the management server is further provided with the propose device.

Feature [7]: In the point management system using the vehicle as the contact point according to any one of the features [1] to [6], the propose device proposes an activity that the user can accumulate more points.

Feature [8]: In the point management system using the vehicle as the contact point according to any one of the features [1] to [5], the in-vehicle device proposes an activity to the user at a timing when an ignition of the vehicle is turned on.

Feature [9]: In the point management system using the vehicle as the contact point according to any one of the features [1] to [8], the propose device proposes an activity that spans a plurality of categories.

Feature [10] A point management system using a vehicle as a contact point includes at least one of (i) a circuit and (ii) a processor having a memory storing computer program code. The at least one of the circuit and the processor having the memory is configured to cause the point management system to provide at least one of: an in-vehicle device mounted on the vehicle; and a management server that communicates with the in-vehicle device. The point management system gives a point to an user as a driver of the vehicle according to a degree of eco-driving when the driver performs the eco-driving. The at least one of the circuit and the processor having the memory is configured to cause the point management system to further provide at least one of: an eco-driving evaluation device that evaluates the degree of the eco-driving according to a travel state of the vehicle; a point giving device that gives the point to the user according to an evaluation by the eco-driving evaluation device; and a propose device that proposes a behavior to be recommended to the driver related to the eco-driving.

Feature [11]: In the point management system using the vehicle as the contact point according to the feature [10], the eco-driving evaluation device evaluates the degree of the eco-driving according to at least an accelerator work of the driver, a power consumption of the vehicle, and a load amount of the vehicle.

Feature [12]: In the point management system using the vehicle as the contact point according to the feature [10] or [11], the propose device instructs a driving behavior to the driver, and the eco-driving evaluation device evaluates the degree of the eco-driving according to a degree of compliance with an instructed driving behavior.

Feature [13]: In the point management system using the vehicle as the contact point according to the feature [12], the driving behavior instructed to the driver includes a behavior that a numerical number of times or a period of high-load operations is less than a threshold value.

Feature [14]: In the point management system using the vehicle as the contact point according to any one of the features [10] to [13], the point giving device gives the point at a timing when the vehicle passes a predetermined checkpoint.

Feature [15]: In the point management system using the vehicle as the contact point according to any one of the features [10] to [14], the point giving device gives the point to a fellow passenger of the vehicle in addition to the driver.

Feature [16] A point management system using a vehicle as a contact point includes at least one of (i) a circuit and (ii) a processor having a memory storing computer program code. The at least one of the circuit and the processor having the memory is configured to cause the point management system to provide at least one of: an in-vehicle device mounted on the vehicle; a smart device carried by an user of the vehicle and connectable to the in-vehicle device; and a management server that communicates with the in-vehicle device. The point management system gives a point to the user of the vehicle according to a specific health care activity when the user performs the specific health care activity using the vehicle as a contact point. The at least one of the circuit and the processor having the memory is configured to cause the point management system to further provide at least one of: a healthcare activity evaluation device that evaluates that the user has performed the specific healthcare activity; a point giving device that gives the point to the user according to an evaluation by the healthcare activity evaluation device; and a propose device that proposes the health care activity to the user.

Feature [17]: In the point management system using the vehicle as the contact point according to the feature [16], the healthcare activity evaluation device evaluates that the user has performed the specific healthcare activity based on cooperation with an application of the smart device.

Feature [18]: In the point management system using the vehicle as the contact point according to the feature [16] or [17], the vehicle is equipped with a location detection function; and the healthcare activity evaluation device evaluates that the user has performed the specific healthcare activity based on a feature that a destination of the vehicle is a place where the healthcare activity is to be performed.

Feature [19]: In the point management system using the vehicle as the contact point according to any one of the features [16] to [18], the healthcare activity evaluation device checks that the user has performed the specific healthcare activity based on behavior record information of the user acquired from the smart device.

Feature [20]: In the point management system using the vehicle as the contact point according to any one of the features [16] to [19], the in-vehicle device transmits point information to be given to the user to the management server at a timing that an ignition of the vehicle is turned off and the driver gets off the vehicle, and causes the management server to record the point information.

Feature [21]: In the point management system using the vehicle as the contact point according to any one of the features [16] to [20], the propose device proposes to the user the health care activity at a place where the user has performed a social contribution activity.

Feature [22] A point management system using a vehicle as a contact point includes at least one of (i) a circuit and (ii) a processor having a memory storing computer program code. The at least one of the circuit and the processor having the memory is configured to cause the point management system to provide at least one of: an in-vehicle device mounted on the vehicle; a smart device carried by an user of the vehicle and connectable to the in-vehicle device; and a management server that communicates with the in-vehicle device. The point management system gives a point to the user according to a specific social contribution activity when the user performs the specific social contribution activity using the vehicle as the contact point. The at least one of the circuit and the processor having the memory is configured to cause the point management system to further provide at least one of: a social contribution activity evaluation device that evaluates that the user has performed the specific social contribution activity; a point giving device that gives the point to the user according to an evaluation by the social contribution activity evaluation device; and a propose device that proposes the social contribution activity to the user.

Feature [23]: In the point management system using the vehicle as the contact point according to the feature [22], the social contribution activity evaluation device evaluates that the user has performed the specific social contribution activity based on cooperation with an application of the smart device.

Feature [24]: In the point management system using the vehicle as the contact point according to the feature [22] or [23], the vehicle is equipped with a location detection function; and the social contribution activity evaluation device evaluates that the user has performed the specific social contribution activity based on a feature that a destination of the vehicle is a place where the social contribution activity is to be performed.

Feature [25]: In the point management system using the vehicle as the contact point according to any one of the features [22] to [24], the social contribution activity evaluation device transmits point information to be given to the user to the management server when acquiring information, from the smart device, that the user has completed the specific social contribution activity, and causes the management server to record the point information.

Feature [26] A point management system using a vehicle as a contact point includes at least one of (i) a circuit and (ii) a processor having a memory storing computer program code. The at least one of the circuit and the processor having the memory is configured to cause the point management system to provide at least one of: an in-vehicle device mounted on the vehicle; a smart device carried by an user of the vehicle and connectable to the in-vehicle device; and a management server that communicates with the in-vehicle device. The point management system gives a point to the user according to a specific social contribution activity when the user performs the specific social contribution activity using the vehicle as the contact point. The management server is configured to be able to communicate with the smart device. The management server includes a point management unit that manages an utilization of the point for each user of the smart device.

Feature [27]: In the point management system using the vehicle as the contact point according to the feature [26], the management server manages the point according to an ID for point management. A plurality of users or a plurality of vehicles can register a same ID.

Feature [28]: In the point management system using the vehicle as the contact point according to the feature [27], the management server always manages a total possession point of all users or all vehicles linked to one ID as latest information.

Feature [29]: In the point management system using the vehicle as the contact point according to any one of the features [26] to [28], the management server acquires a list of an available facility of the point and latest point information from the management server or another server.

Feature [30]: In the point management system using the vehicle as the contact point according to any one of the features [26] to [29], the management server performs a process for transferring a part of or all of the point that the user possesses to another user who is designated by the user and for subtracting a transferred point from the point.

Feature [31]: In the point management system using the vehicle as the contact point according to any one of the features [26] to [30], the management server performs a process for converting a part of or all of the point that the user possesses to a coupon or another point of another service in cooperation with another server, and subtracting a converted point from the point.

Feature [32]: In the point management system using the vehicle as the contact point according to the feature [30] or [31], when the user utilizes the point that the user possesses, and the management server subtracts the point, the management server notifies all users linked to an ID of the user.

Feature [33]: In the point management system using the vehicle as the contact point according to the feature [32], when the user utilizes the point, and the management server subtracts the point, another user linked to a same ID can refuse subtraction.

Feature [34] A point management system using a vehicle as a contact point includes at least one of (i) a circuit and (ii) a processor having a memory storing computer program code. The at least one of the circuit and the processor having the memory is configured to cause the point management system to provide at least one of: an in-vehicle device mounted on the vehicle; a smart device carried by an user of the vehicle and connectable to the in-vehicle device; and a management server that communicates with the in-vehicle device. The point management system gives a point to the user according to a specific social contribution activity when the user performs the specific social contribution activity using the vehicle as the contact point. The management server proposes to encourage the user to utilize the point that has been given and accumulated.

Feature [35]: In the point management system using the vehicle as the contact point according to the feature [34], the management server guides a point available facility disposed around the vehicle or the user based on location information and a route of the vehicle or the user.

Feature [36]: In the point management system using the vehicle as the contact point according to the feature [34] or [35], the management server causes the user to transfer a part of or all of the point that the user possesses to another user who is designated by the user.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause a point management system to perform functions" should be understood that (i) only the circuit can cause a point management system to perform all the functions, (ii) only the processor can cause a point management system to perform all the functions, or (iii) the circuit can cause a point management system to perform at least one of the functions and the processor can cause a point management system to perform the remaining functions. For instance, in the case of the above-described (iii), function A and B among the functions A to C may be implemented by a circuit, while the remaining function C may be implemented by a processor.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A point management system using a vehicle as a contact point for giving a point to an user of the vehicle according to a specific activity when the user performs the specific activity using the vehicle as the contact point, the point management system comprising:
   an in-vehicle device mounted on the vehicle;
   a smart device carried by the user of the vehicle and connectable to the in-vehicle device;
   a management server that communicates with the in-vehicle device;
   an evaluation device that evaluates the specific activity of the user based on vehicle information according to a travel state of the vehicle or activity information recorded in the smart device;
   a point giving device that gives the point to the user according to an evaluation by the evaluation device; and
   a propose device that proposes, to the user, an activity for which the point is given, wherein:
   the specific activity includes at least one of three categories of activities: an eco-driving activity, a healthcare activity, and a social contribution activity; and
   the propose device proposes an activity that spans a plurality of categories.

2. The point management system using the vehicle as the contact point according to claim 1, wherein:
   the evaluation device and the point giving device are provided in the in-vehicle device.

3. The point management system using the vehicle as the contact point according to claim 2, wherein:
   the in-vehicle device transmits point information to be given to the user to the management server, and causes the management server to record the point information.

4. The point management system using the vehicle as the contact point according to claim 1, wherein:
   the in-vehicle device cooperates with the management server to grasp a current number of the point acquired by the user.

5. The point management system using the vehicle as the contact point according to claim 1, wherein:
   the evaluation device and the point giving device are provided in the management server.

6. The point management system using the vehicle as the contact point according to claim 5, wherein:
   the propose device is further provided in the management server.

7. The point management system using the vehicle as the contact point according to claim 1, wherein:
   the propose device proposes, to the user, an activity that the user can accumulate more points.

8. The point management system using the vehicle as the contact point according to claim 1, wherein:
   the in-vehicle device proposes an activity to the user at a timing when an ignition of the vehicle is turned on.

9. The point management system using the vehicle as the contact point according to claim 1, further comprising:
   at least one of (i) a circuit and (ii) a processor having a memory storing computer program code, wherein:
   the at least one of the circuit and the processor having the memory is configured to cause the point management system to provide at least one of: the in-vehicle device; the smart device; the management server; the evaluation device; the point giving device; and the propose device.

10. A point management system using a vehicle as a contact point for giving a point to an user of the vehicle according to a degree of an eco-driving activity when the user as a driver of the vehicle performs the eco-driving activity using the vehicle as the contact point, the point management system comprising:
   an in-vehicle device mounted on the vehicle;
   a management server that communicates with the in-vehicle device;
   an eco-driving evaluation device that evaluates the degree of the eco-driving activity according to a travel state of the vehicle;
   a point giving device that gives the point to the user according to an evaluation by the eco-driving evaluation device; and
   a propose device that proposes a behavior to be recommended to the driver related to the eco-driving activity, wherein:
   the propose device instructs a driving behavior to the driver; and
   the eco-driving evaluation device evaluates the degree of the eco-driving activity according to a degree of compliance with the instructed driving behavior.

11. The point management system using the vehicle as the contact point according to claim 10, wherein:
   the eco-driving evaluation device evaluates the degree of the eco-driving activity according to at least an accelerator work of the driver, a power consumption of the vehicle, and a load amount of the vehicle.

12. The point management system using the vehicle as the contact point according to claim 10, wherein:

the driving behavior to be instructed to the driver includes a behavior that a numerical number of times or a period of high-load operations is less than a threshold value.

13. The point management system using the vehicle as the contact point according to claim 10, wherein:

the point giving device gives the point at a timing when the vehicle passes a predetermined checkpoint.

14. The point management system using the vehicle as the contact point according to claim 10, wherein:

the point giving device gives the point to a fellow passenger of the vehicle in addition to the driver.

15. The point management system using the vehicle as the contact point according to claim 10, further comprising:

at least one of (i) a circuit and (ii) a processor having a memory storing computer program code, wherein:

the at least one of the circuit and the processor having the memory is configured to cause the point management system to provide at least one of: the in-vehicle device; the management server; the eco-driving evaluation device; the point giving device; and the propose device.

16. The point management system using the vehicle as the contact point according to claim 10, wherein:

the eco-driving evaluation device evaluates the degree of the eco-driving activity according to at least a driver's accelerator work, a power consumption of the vehicle, and a load amount of the vehicle.

17. A point management system using a vehicle as a contact point for giving a point to an user of the vehicle according to a specific health care activity when the user performs the specific health care activity using the vehicle as the contact point, the point management system comprising:

an in-vehicle device mounted on the vehicle;

a smart device carried by the user of the vehicle and connectable to the in-vehicle device;

a management server that communicates with the in-vehicle device;

a healthcare activity evaluation device that evaluates that the user has performed the specific health care activity;

a point giving device that gives the point to the user according to an evaluation by the healthcare activity evaluation device; and a propose device that proposes the health care activity to the user, wherein:

the vehicle is equipped with a location detection function; and the healthcare activity evaluation device evaluates that the user has performed the specific healthcare activity based on a feature that a destination of the vehicle is a place where the healthcare activity is to be performed.

18. The point management system using the vehicle as the contact point according to claim 17, wherein:

the healthcare activity evaluation device evaluates that the user has performed the specific healthcare activity based on cooperation with an application of the smart device.

19. The point management system using the vehicle as the contact point according to claim 17, wherein:

the healthcare activity evaluation device checks that the user has performed the specific healthcare activity based on behavior record information of the user acquired from the smart device.

20. The point management system using the vehicle as the contact point according to claim 17, wherein:

the in-vehicle device transmits point information to be given to the user to the management server at a timing that an ignition of the vehicle is turned off and the user gets off the vehicle, and causes the management server to record the point information.

21. The point management system using the vehicle as the contact point according to claim 17, wherein:

the propose device proposes to the user the health care activity at a place where the user has performed a social contribution activity.

22. The point management system using the vehicle as the contact point according to claim 17, further comprising:

at least one of (i) a circuit and (ii) a processor having a memory storing computer program code, wherein:

the at least one of the circuit and the processor having the memory is configured to cause the point management system to provide at least one of: the in-vehicle device; the smart device; the management server; the healthcare activity evaluation device; the point giving device; and the propose device.

23. A point management system using a vehicle as a contact point for giving a point to an user of the vehicle according to a specific social contribution activity when the user performs the specific social contribution activity using the vehicle as the contact point, the point management system comprising:

an in-vehicle device mounted on the vehicle;

a smart device carried by the user of the vehicle and connectable to the in-vehicle device;

a management server that communicates with the in-vehicle device;

a social contribution activity evaluation device that evaluates that the user has performed the specific social contribution activity;

a point giving device that gives the point to the user according to an evaluation by the social contribution activity evaluation device; and a propose device that proposes the social contribution activity to the user, wherein:

the vehicle is equipped with a location detection function; and the social contribution activity evaluation device evaluates that the user has performed the specific social contribution activity based on a feature that a destination of the vehicle is a place where the social contribution activity is to be performed.

24. The point management system using the vehicle as the contact point according to claim 23, wherein:

the social contribution activity evaluation device evaluates that the user has performed the specific social contribution activity based on cooperation with an application of the smart device.

25. The point management system using the vehicle as the contact point according to claim 23, wherein:

the social contribution activity evaluation device transmits point information to be given to the user to the management server when acquiring information, from the smart device, that the user has completed the specific social contribution activity, and causes the management server to record the point information.

26. The point management system using the vehicle as the contact point according to claim 23, further comprising:

at least one of (i) a circuit and (ii) a processor having a memory storing computer program code, wherein:

the at least one of the circuit and the processor having the memory is configured to cause the point management system to provide at least one of: the in-vehicle device; the smart device; the management server; the social contribution activity evaluation device; the point giving device; and the propose device.

* * * * *